(12) United States Patent
Sasayama

(10) Patent No.: US 8,157,345 B2
(45) Date of Patent: Apr. 17, 2012

(54) IMAGE RECORDING APPARATUS, IMAGE PROCESSING APPARATUS, IMAGE PROCESSING METHOD AND COMPUTER-READABLE MEDIUM

(75) Inventor: Hiroyuki Sasayama, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 232 days.

(21) Appl. No.: 12/712,753

(22) Filed: Feb. 25, 2010

(65) Prior Publication Data

US 2010/0214347 A1    Aug. 26, 2010

(30) Foreign Application Priority Data

Feb. 26, 2009    (JP) .................. 2009-044575

(51) Int. Cl.
*B41J 29/393* (2006.01)

(52) U.S. Cl. ................. 347/19; 347/5; 347/14

(58) Field of Classification Search .................. 347/5, 6, 347/9, 14, 15, 19, 20
See application file for complete search history.

(56) References Cited

U.S. PATENT DOCUMENTS

| 7,533,953 B2 * | 5/2009 | Vladislav et al. | 347/14 |
| 7,540,580 B2 * | 6/2009 | Oku | 347/19 |
| 2005/0099446 A1 | 5/2005 | Mizes et al. | |

FOREIGN PATENT DOCUMENTS

JP    2005-141232 A    6/2005

* cited by examiner

*Primary Examiner* — Juanita D Jackson
(74) *Attorney, Agent, or Firm* — Birch, Stewart, Kolasch & Birch, LLP

(57) ABSTRACT

An image recording apparatus includes: an image reading device which reads a test chart including a density pattern output by a test chart output device; a reading position information acquisition device which acquires reading position information for the density pattern, according to an image of the test chart; a density information acquisition device which acquires reading density information for the density pattern corresponding to the reading position information; a recording defect information acquisition device which acquires recording defect information indicating a recording element having a recording defect; a density non-uniformity correction value calculation device which calculates density non-uniformity correction values for recording elements; a density non-uniformity correction device which performs non-uniformity correction of image data, according to the density non-uniformity correction values; and an image output device which outputs the image data that has been subjected to the non-uniformity correction.

12 Claims, 15 Drawing Sheets

FIG.15
RELATED ART
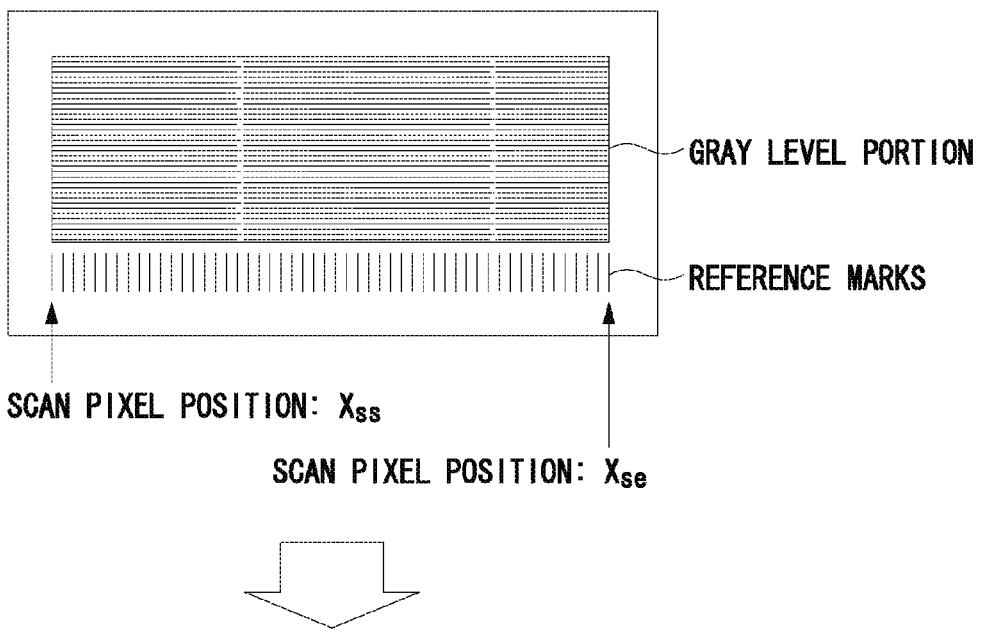
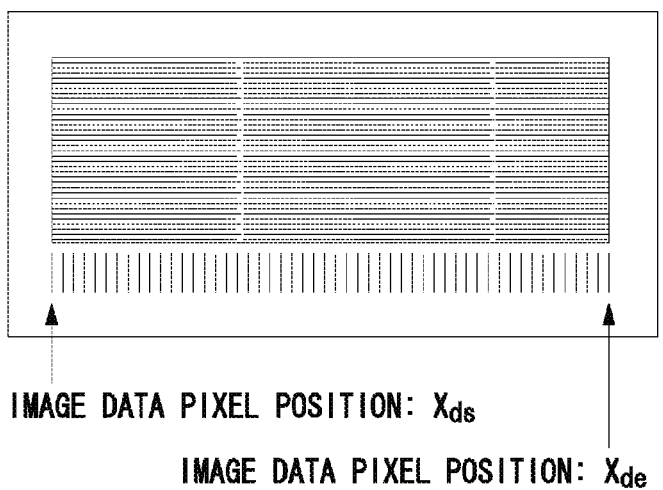

FIG.16
RELATED ART
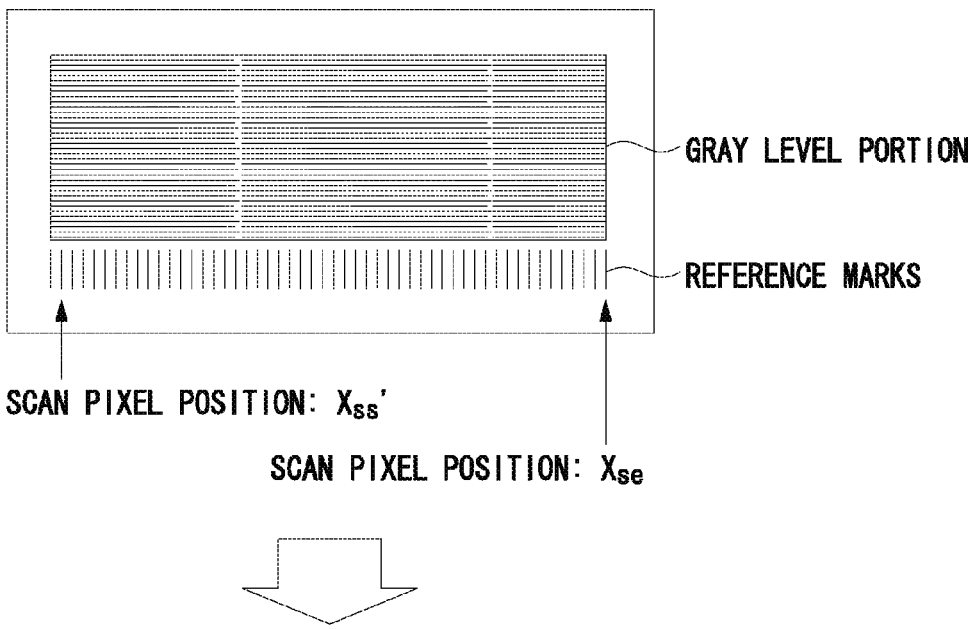
SCAN IMAGE
GRAY LEVEL PORTION
REFERENCE MARKS
SCAN PIXEL POSITION: $X_{ss}'$
SCAN PIXEL POSITION: $X_{se}$
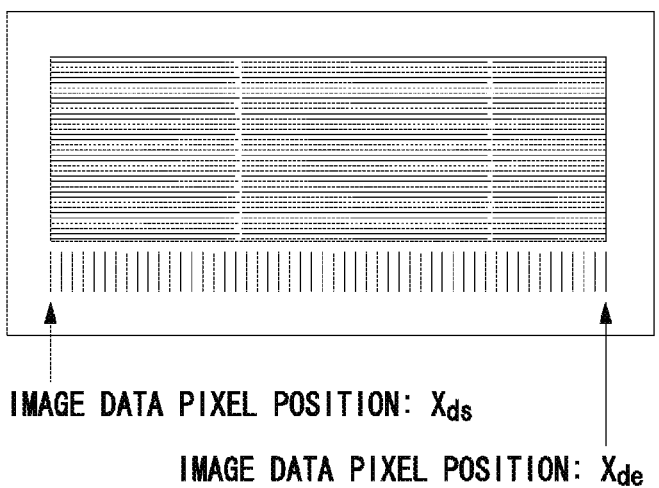
IMAGE DATA
IMAGE DATA PIXEL POSITION: $X_{ds}$
IMAGE DATA PIXEL POSITION: $X_{de}$

IMAGE RECORDING APPARATUS, IMAGE PROCESSING APPARATUS, IMAGE PROCESSING METHOD AND COMPUTER-READABLE MEDIUM

BACKGROUND OF THE INVENTION

1. Field of the Invention

The present invention relates to an image recording apparatus, an image processing apparatus, an image processing method and a computer-readable medium, and more particularly, to an image recording apparatus, an image processing apparatus, an image processing method and a computer-readable medium which correct density non-uniformities caused by variations in the characteristics of respective recording elements when recording an image on a recording medium (recording paper) using a recording head in which a plurality of recording elements are provided.

2. Description of the Related Art

In the inkjet recording apparatus, from the viewpoint of stabilizing print quality, it is important to make the ink ejection volume uniform from each of a plurality of nozzles which are formed in a recording head. In order to make the ink ejection volume from each nozzle uniform, the ink ejection volume from each nozzle when a prescribed value is input is measured, and the input values for the respective nozzles are corrected on the basis of the measured ejection volume. This measurement of the ejection volume is carried out, for example, by outputting a test chart and reading in the test chart by means of a scanner.

Japanese Patent Application Publication No. 2005-141232 discloses technology which converts position information in a scanner image into position information in image data, on the basis of position information obtained from a reference mark included in a test chart, when correcting density non-uniformities in the output of images on the basis of density information acquired from a test chart for density measurement. According to this technology, it is possible to correct density non-uniformities appropriately, even if there is divergence between the pixels of the scanner used to scan the test chart and the pixels in the image forming device that is used to print the test chart.

Here, a brief outline of Japanese Patent Application Publication No. 2005-141232 will be described. FIG. 15 is a diagram illustrating a scan image read in by scanning a test chart output in a case where the nozzle ejection characteristics are normal, and image data converted to the nozzle resolution on the basis of this scan image.

As illustrated in FIG. 15, the test chart is constituted by a gray level portion and reference marks. The gray level portion is printed by inputting the same density value to all of the nozzles. Furthermore, the reference marks are printed at prescribed intervals in the breadthways direction of the gray level portion, and serve as guide marks when allocating the density data in the breadthways direction of the gray level portion with the respective nozzles.

The central position of the reference marks is extracted from the scan image of the test chart, and a gray level profile is created by setting the density of the gray level portion as a function of the position in the breadthways direction. Moreover, the gray level profile is converted from scanner pixel units to nozzle pixel units (image data pixel units) on the basis of the central position of the reference marks thus extracted, and the local TRC (tone reproduction curve: a density conversion curve for each pixel) is calculated with respect to the image data pixels.

In this case, the left-end scan pixel position $X_{ss}$ and the right-end scan pixel position $X_{se}$ when facing the image of reference marks are judged to be the lateral direction boundaries of the gray level portion, and are converted respectively into an image data pixel position $X_{ds}$ and an image data pixel position $X_{de}$. In other words, the gray level portion is converted in image data pixel units to an image from $X_{ds}$ to $X_{de}$.

Here, a case where there is an ejection failure nozzle (non-ejection nozzle) in the nozzles which print the reference marks will be described. FIG. 16 is a diagram illustrating a scan image read by scanning a test chart output when there is an ejection failure nozzle, and image data for density correction generated on the basis of this scan image, and depicts a case where the left-end nozzle when facing the image is suffering ejection failure.

As illustrated in FIG. 16, since the left-end nozzle is suffering ejection failure, then of the reference marks which ought to be printed, the left-end reference mark is not printed. Therefore, the scan pixel position $X_{ss}'$ printed at the furthest left-hand end of the reference marks of the scan image is judged to be the left-side boundary of the gray level portion and is converted into an image data pixel position $X_{ds}$. More specifically, the gray level portion is converted in image data pixel units, to an image from $X_{ds}$ to $X_{de}$, but since $X_{ds}$ is allocated to a position different to the intended position $X_{ss}$, then the scan pixel positions are not allocated correctly to the image data pixel positions.

In this way, according to the technology in Japanese Patent Application Publication No. 2005-141232, if there is an ejection failure nozzle in the nozzles which print the reference marks, the pixels of the scan image and the image data are not allocated correctly, and therefore density non-uniformities cannot be corrected appropriately. Japanese Patent Application Publication No. 2005-141232 does not disclose ways of avoiding this problem.

SUMMARY OF THE INVENTION

The present invention has been contrived in view of these circumstances, an object thereof being to provide an image recording apparatus, an image processing apparatus, an image processing method and a computer-readable medium whereby density non-uniformities can be corrected appropriately, even if there is a nozzle suffering ejection failure.

In order to attain an object described above, one aspect of the present invention is directed to an image recording apparatus, comprising: a recording head having a plurality of recording elements; a conveyance device which conveys at least one of the recording head and a recording medium so as to cause relative movement between the recording head and the recording medium; a test chart output device which outputs a test chart including at least a density pattern onto the recording medium by using the recording head; an image reading device which reads in the test chart output by the test chart output device; a reading position information acquisition device which acquires reading position information for the density pattern, according to an image of the test chart obtained by reading in the test chart by the image reading device; a density information acquisition device which acquires reading density information for the density pattern corresponding to the reading position information, according to the image of the test chart obtained by reading in the test chart by the image reading device; a recording defect information acquisition device which acquires recording defect information indicating a recording element having a recording defect, of the plurality of recording elements; a density non-uniformity correction value calculation device which calculates density non-uniformity correction values for the plurality of recording elements, according to previously prepared output position information which indicates output positions of the plurality of recording elements with respect to the density pattern, the reading position information, the reading density information and the recording defect information; a density non-uniformity correction device which performs non-uniformity correction of image data, according to the density non-uniformity correction values; and an image output device which outputs the image data that has been subjected to the non-uniformity correction by the density non-uniformity correction device, onto the recording medium.

According to this aspect of the invention, reading position information and reading density information for a density pattern are acquired on the basis of the read image of a test chart which includes the density pattern, and density non-uniformity correction values for a plurality of recording elements are calculated on the basis of output position information, which is previously prepared output position information that indicates the output positions of the plurality of recording elements with respect to the density pattern, and on the basis of the reading position information, the reading density information, and recording defect information indicating recording elements having a recording defect, of the plurality of recording elements. Therefore, the correspondence between the reading position information and the output position information is accurate and even if there is a recording element having a recording defect, density non-uniformity can still be corrected appropriately.

Desirably, the density non-uniformity correction value calculation device includes: an output position information amendment device which amends the output position information according to the recording defect information; and a density information allocation device which associates the reading position information with the output position information so as to allocate the reading density information to output density information of the plurality of recording elements, and the density non-uniformity correction value calculation device calculates the density non-uniformity correction values for the plurality of recording elements according to the output density information.

According to this aspect of the invention, it is possible to calculate density non-uniformity correction values appropriately.

Desirably, the test chart includes reference marks constituted by a plurality of lines arranged at a prescribed interval in a direction of arrangement of the plurality of recording elements; and the reading position information acquisition device acquires the reading position information for the density pattern according to the reference marks.

According to this aspect of the invention, it is possible to acquire reading position information for the density pattern, appropriately.

Desirably, each of the plurality of lines constituting the reference marks is associated with one recording element.

Desirably, the output position information is information on recording elements at positions respectively corresponding to the plurality of lines constituting the reference marks; the image recording apparatus further comprises a judgment device which judges whether or not the recording elements at the positions respectively corresponding to the plurality of lines constituting the reference marks include a recording element having a recording defect, according to the recording defect information; and when the judgment device judges that the recording elements includes a recording element having a recording defect, then the output position information amendment device amends the output position information in such a manner that the density information allocation device does not use information on the recording element having the recording defect.

According to this aspect of the invention, it is possible appropriately to prevent adverse effects due to the loss of reference marks caused by a recording element having a recording defect.

Desirably, the reading position information acquisition device acquires the reading position information for the density pattern according to a density edge portion of the density pattern in a direction of arrangement of the plurality of recording elements.

According to this aspect of the invention, it is possible to acquire reading position information for a density pattern appropriately.

Desirably, the output position information is information on the recording element at a position corresponding to the density edge portion; and if the recording element at the position corresponding to the density edge portion has a recording defect, the output position information amendment device adopts information on the recording element at a position one place toward inside in respect of the density pattern, as the output position information.

According to this aspect of the invention, it is possible appropriately to prevent adverse effects due to the loss of a density edge portion caused by a recording element having a recording defect.

Desirably, the recording defect information acquisition device uses a test chart for recording defect determination to acquire the recording defect information.

According to this aspect of the invention, it is possible to acquire recording defect information appropriately.

Desirably, the plurality of recording elements are ink ejection nozzles.

According to this aspect of the invention, it is possible to the image recording apparatus to an inkjet printer having ink ejection nozzles.

In order to attain an object described above, another aspect of the present invention is directed to an image processing apparatus, comprising: a reading position information acquisition device which acquires reading position information for a density pattern, according to a read image of a test chart including at least the density pattern, the test chart having been output onto a recording medium while relative movement between a recording head having a plurality of recording elements and the recording medium by conveying at least one of the recording head and the recording medium; a density information acquisition device which acquires reading density information for the density pattern corresponding to the reading position information, according to the read image of the test chart; a recording defect information acquisition device which acquires recording defect information indicating a recording element having a recording defect, of the plurality of recording elements; a density non-uniformity correction value calculation device which calculates density non-uniformity correction values for the plurality of recording elements, according to previously prepared output position information which indicates output positions of the plurality of recording elements with respect to the density pattern, the reading position information, the reading density information and the recording defect information; and a density non-uniformity correction device which performs non-uniformity correction of image data, according to the density non-uniformity correction values.

In order to attain an object described above, another aspect of the present invention is directed to an image processing method, comprising: a reading position information acquisition step of acquiring reading position information for a density pattern, according to a read image of a test chart including at least the density pattern, the test chart having been output onto a recording medium while relative movement between a recording head having a plurality of recording elements and the recording medium by conveying at least one of the recording head and the recording medium; a density information acquisition step of acquiring reading density information for the density pattern corresponding to the reading position information, according to the read image of the test chart; a recording defect information acquisition step of acquiring recording defect information indicating a recording element having a recording defect, of the plurality of recording elements; a density non-uniformity correction value calculation step of calculating density non-uniformity correction values for the plurality of recording elements, according to previously prepared output position information which indicates output positions of the plurality of recording elements with respect to the density pattern, the reading position information, the reading density information and the recording defect information; and a density non-uniformity correction step of performing non-uniformity correction of image data, according to the density non-uniformity correction values.

In order to attain an object described above, another aspect of the present invention is directed to a computer-readable medium storing instructions to cause a computer to execute at least an image processing method, comprising: a reading position information acquisition step of acquiring reading position information for a density pattern, according to a read image of a test chart including at least the density pattern, the test chart having been output onto a recording medium while relative movement between a recording head having a plurality of recording elements and the recording medium by conveying at least one of the recording head and the recording medium; a density information acquisition step of acquiring reading density information for the density pattern corresponding to the reading position information, according to the read image of the test chart; a recording defect information acquisition step of acquiring recording defect information indicating a recording element having a recording defect, of the plurality of recording elements; a density non-uniformity correction value calculation step of calculating density non-uniformity correction values for the plurality of recording elements, according to previously prepared output position information which indicates output positions of the plurality of recording elements with respect to the density pattern, the reading position information, the reading density information and the recording defect information; and a density non-uniformity correction step of performing non-uniformity correction of image data, according to the density non-uniformity correction values.

A program which causes a computer to implement these image processing methods can be also included in the present invention.

According to the present invention, reading position information and reading density information for a density pattern are acquired on the basis of the read image of a test chart which includes the density pattern, and density non-uniformity correction values for a plurality of recording elements are calculated on the basis of output position information, which is previously prepared output position information that indicates the output positions of the plurality of recording elements with respect to the density pattern, and on the basis of the reading position information, the reading density information, and recording defect information indicating recording elements having a recording defect, of the plurality of recording elements. Therefore, the correspondence between the reading position information and the output position information is accurate and even if there is a recording element having a recording defect, density non-uniformity can still be corrected appropriately.

BRIEF DESCRIPTION OF THE DRAWINGS

FIG. 15 is a diagram for describing a gray level and reference marks according to the related art; and FIG. 16 is a diagram for describing a case where there is an ejection failure nozzle according to the related art.

DESCRIPTION OF THE PREFERRED EMBODIMENTS

Composition of Inkjet Recording Apparatus

Figure 1:
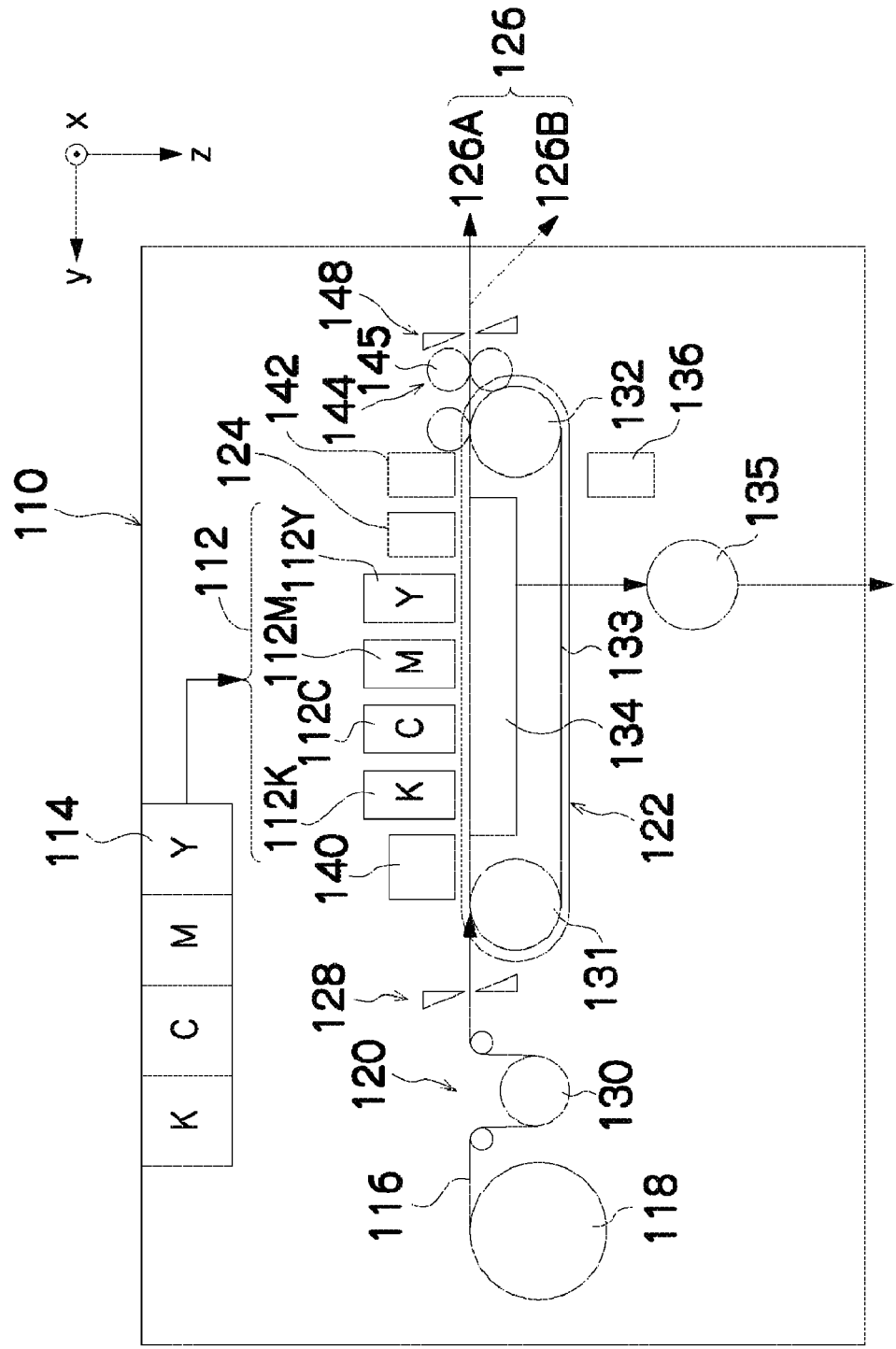
FIG. 1 is a general schematic drawing of an inkjet recording apparatus employing an image processing apparatus relating to one embodiment of the present invention.

FIG. 1 is a general configuration diagram of an image forming device according to one embodiment of the present invention. As illustrated in FIG. 1, the inkjet recording apparatus 110 according to the present embodiment comprises: a recording head (printing unit) 112 having a plurality of inkjet recording heads (hereafter, also simply called "heads") 112K, 112C, 112M, and 112Y provided for the respective ink colors (i.e. black, cyan, magenta and yellow); an ink storing and loading unit 114 for storing inks of K, C, M and Y to be supplied to the printing heads 112K, 112C, 112M, and 112Y; a paper supply unit 118 for supplying recording paper (recording medium) 116; a decurling unit 120 removing curl in the recording paper 116; a belt conveyance unit 122 disposed facing the nozzle face (ink-droplet ejection face) of the recording head 112, for conveying the recording paper 116 while keeping the recording paper 116 flat; a print determination unit 124 for reading the recorded result produced by the recording head 112; and a paper output unit 126 for outputting image-printed paper (printed matter) to the exterior.

The ink storing and loading unit 114 comprises ink tanks for storing inks of colors corresponding to the heads 112K, 112C, 112M and 112Y, and the ink tanks are respectively connected to the heads 112K, 112C, 112M and 112Y via prescribed channels. The ink storing and loading unit 114 also comprises a warning device (for example, a display device or an alarm sound generator) for warning when the remaining amount of any ink is low, and has a mechanism for preventing loading errors between different colors.

In FIG. 1, a magazine for rolled paper (continuous paper) is illustrated as an example of the paper supply unit 118; however, more magazines with paper differences such as paper width and quality may be jointly provided. Moreover, papers may be supplied with cassettes that contain cut papers loaded in layers and that are used jointly or in lieu of the magazine for rolled paper.

In the case of a configuration in which a plurality of types of recording media can be used, it is desirable that an information recording medium such as a bar code and a wireless tag containing information about the type of medium is attached to the magazine, and by reading the information contained in the information recording medium with a predetermined reading device, the type of medium to be used is automatically determined, and ink-droplet ejection is controlled so that the ink-droplets are ejected in an appropriate manner in accordance with the type of medium.

The recording paper 116 delivered from the paper supply unit 118 retains curl due to having been loaded in the magazine. In order to remove the curl, heat is applied to the recording paper 116 in the decurling unit 120 by a heating drum 130 in the direction opposite from the curl direction in the magazine. The heating temperature at this time is desirably controlled so that the recording paper 116 has a curl in which the surface on which the print is to be made is slightly round outward.

In the case of a configuration in which roll paper is used, a cutter (first cutter) 128 is provided and the roll paper is cut to a desired size by the cutter 128. When cut paper is used, the cutter 128 is not required.

The decurled and cut recording paper 116 is delivered to the suction belt conveyance unit 122. The suction belt conveyance unit 122 has a configuration in which an endless belt 133 is set around rollers 131 and 132 so that the portion of the endless belt 133 facing at least the nozzle face of the recording head 112 and the sensor face of the print determination unit 124 forms a plane (flat face).

The belt 133 has a width that is greater than the width of the recording paper 116, and a plurality of suction apertures (not illustrated) are formed on the belt surface. A suction chamber 134 is disposed in a position facing the sensor surface of the print determination unit 124 and the nozzle surface of the recording head 112 on the interior side of the belt 133, which is set around the rollers 131 and 132, as illustrated in FIG. 1. The suction chamber 134 provides suction with a fan 135 to generate a negative pressure, and the recording paper 116 on the belt 133 is held by suction. Instead of this suction system, an electrostatic adsorption system may be used The belt 133 is driven in the clockwise direction in FIG. 1 by the motive force of a motor (reference numeral 188 in FIG. 6) being transmitted to at least one of the rollers 131 and 132, which the belt 133 is set around, and the recording paper 116 held on the belt 133 is conveyed from left to right in FIG. 1.

Since ink adheres to the belt 133 when a marginless print job or the like is performed, a belt-cleaning unit 136 is disposed in a predetermined position (a suitable position outside the printing area) on the exterior side of the belt 133. Although the details of the configuration of the belt-cleaning unit 136 are not illustrated, examples thereof include a configuration in which the belt 133 is nipped with cleaning rollers such as a brush roller and a water absorbent roller, an air blow configuration in which clean air is blown onto the belt 133, and a combination of these. In the case of the configuration in which the belt 133 is nipped with the cleaning rollers, it is desirable to make the line velocity of the cleaning rollers different from that of the belt 133 to improve the cleaning effect.

A roller nip conveyance mechanism, in place of the belt conveyance unit 122, can be employed. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is desirable.

A heating fan 140 is disposed on the upstream side of the recording head 112 in the conveyance pathway formed by the belt conveyance unit 122. The heating fan 140 blows heated air onto the recording paper 116 to heat the recording paper 116 immediately before printing so that the ink deposited on the recording paper 116 dries more easily.

Figure 2:
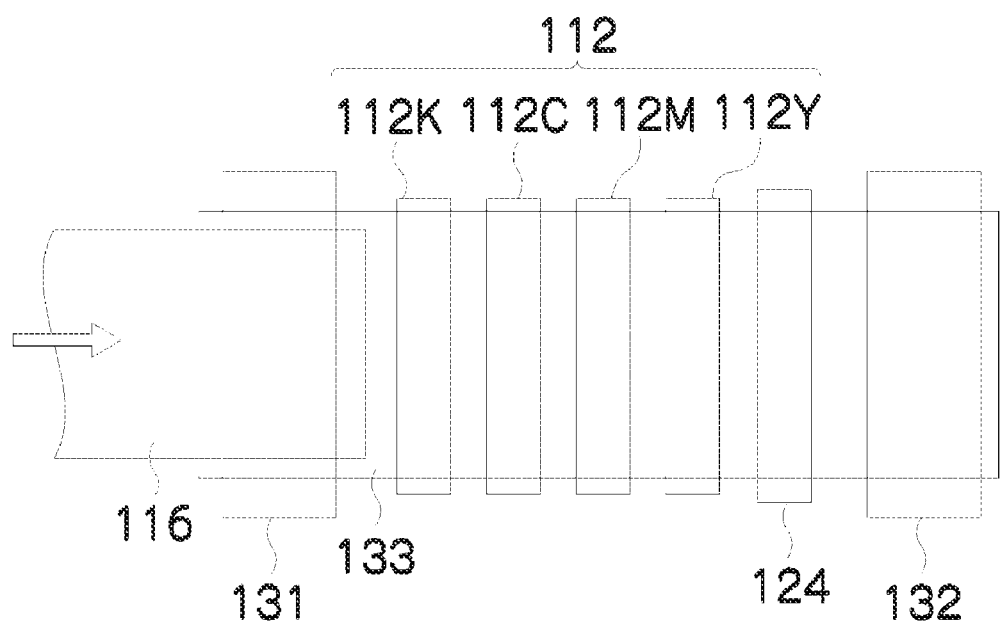
FIG. 2 is a plan view of the principal part of the peripheral area of a recording head in the inkjet recording apparatus illustrated in FIG. 1.

The recording head 112 is a so-called "full line head" in which a line head having a length corresponding to the maximum paper width of the recording paper 116 is fixed extending in a direction (main scanning direction) that is perpendicular to the paper conveyance direction (sub scanning direction). Each of the printing heads 112K, 112C, 112M, and 112Y constituting the recording head 112 is constituted by a line head, in which a plurality of ink ejection ports (nozzles) are arranged along a length (entire width of the recordable area) that exceeds at least one side of the maximum-size recording paper 116 intended for use in the inkjet recording apparatus 110 (see FIG. 2).

The printing heads 112K, 112C, 112M, and 112Y are arranged in the color order of black (K), cyan (C), magenta (M), and yellow (Y) from the upstream side, along the feed direction of the recording paper 116, and are fixed so as to extend in the direction which is substantially perpendicular to the conveyance direction of the recording paper 116.

A color image can be formed on the recording paper 116 by ejecting the different color inks from the printing heads 112K, 112C, 112M, and 112Y, respectively, onto the recording paper 116 while conveying the recording paper 116 by the belt conveyance unit 122.

By adopting the recording head 112 in which the full line type heads 112K, 112C, 112M, and 112Y having nozzle rows covering the full paper width are provided for the respective ink colors in this way, it is possible to record an image on the full surface of the recording paper 116 by performing just one operation of relatively moving the recording paper 116 and the recording head 112 in the paper conveyance direction (the sub-scanning direction), in other words, by means of a single sub-scanning action. Higher-speed printing is thereby made possible and productivity can be improved in comparison with a shuttle type head configuration in which a recording head reciprocates in a direction (the main scanning direction) orthogonal to the paper conveyance direction.

Although the configuration with the KCMY four standard colors is described in the present embodiment, combinations of the ink colors and the number of colors are not limited to those. Light inks, dark inks or special inks can be added as required. For example, a configuration is possible in which inkjet heads for ejecting light-colored inks such as light cyan and light magenta are added. Furthermore, there are no particular restrictions of the sequence in which the heads of respective colors are arranged.

The print determination unit 124 illustrated in FIG. 1 has an image sensor (line sensor or area sensor) for capturing an image of the ink-droplet deposition result of the recording head 112, and functions as a device to check for ejection properties such as clogs of the nozzles in the recording head 112 and the ink landing position errors from the ink-droplet deposition results evaluated by the image sensor. The print determination unit 124 reads a test chart image or practical image printed by the heads 112K, 112C, 112M, and 112Y for the respective colors, and the ejection of each head is determined. The ejection determination includes measurement of the presence of the ejection, measurement of the dot size, and measurement of the dot deposition position.

A post-drying unit 142 is disposed following the print determination unit 124. The post-drying unit 142 is a device to dry the printed image surface, and includes a heating fan, for example. It is desirable to avoid contact with the printed surface until the printed ink dries, and a device that blows heated air onto the printed surface is desirable.

In cases in which printing is performed with dye-based ink on porous paper, blocking the pores of the paper by the application of pressure prevents the ink from coming contact with ozone and other substances that cause dye molecules to break down, and has the effect of increasing the durability of the print.

A heating/pressurizing unit 144 is disposed following the post-drying unit 142. The heating/pressurizing unit 144 is a device to control the glossiness of the image surface, and the image surface is pressed with a pressure roller 145 having a predetermined uneven surface shape while the image surface is heated, and the uneven shape is transferred to the image surface.

The printed matter generated in this manner is outputted from the paper output unit 126. The target print (i.e., the result of printing the target image) and the test print are desirably outputted separately. In the inkjet recording apparatus 110, a sorting device (not illustrated) is provided for switching the outputting pathways in order to sort the printed matter with the target print and the printed matter with the test print, and to send them to paper output units 126A and 126B, respectively. When the target print and the test print are simultaneously formed in parallel on the same large sheet of paper, the test print portion is cut and separated by a cutter (second cutter) 148. Although not illustrated in FIG. 1, the paper output unit 126A for the target prints is provided with a sorter for collecting prints according to print orders.

Structure of the Head

Next, the structure of heads 112K, 112C, 112M and 112Y will be described. The heads 112K, 112C, 112M and 112Y of the respective ink colors have the same structure, and a reference numeral—150 is hereinafter designated to any of the heads.

Figure 3A:
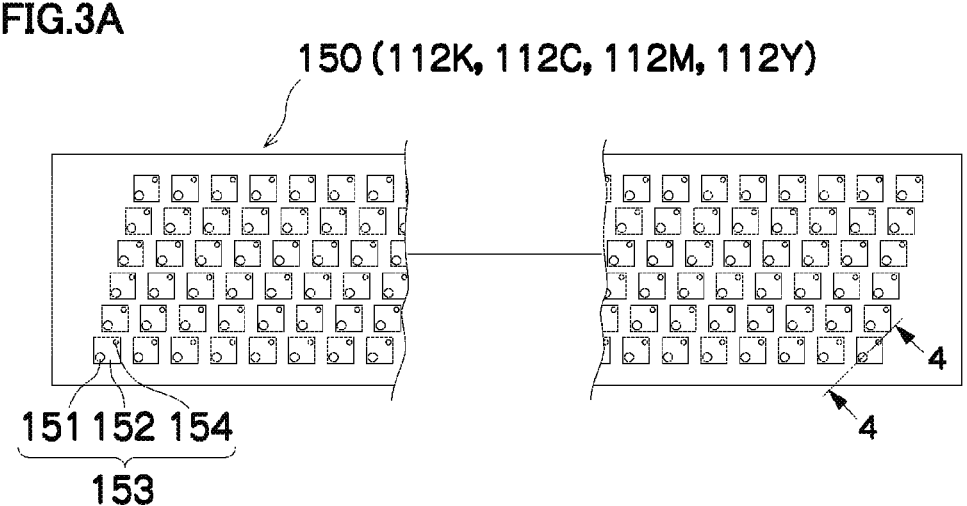
FIGS. 3A to 3C are plan view perspective diagrams illustrating an example of the composition of a printing head.
Figure 3B:
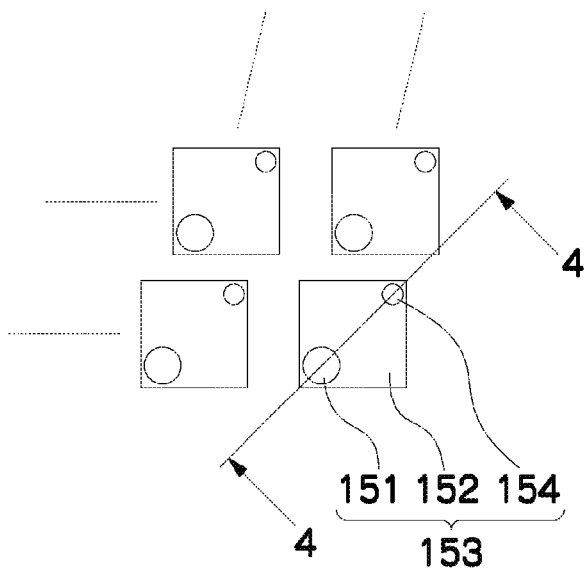
Figure 3C:
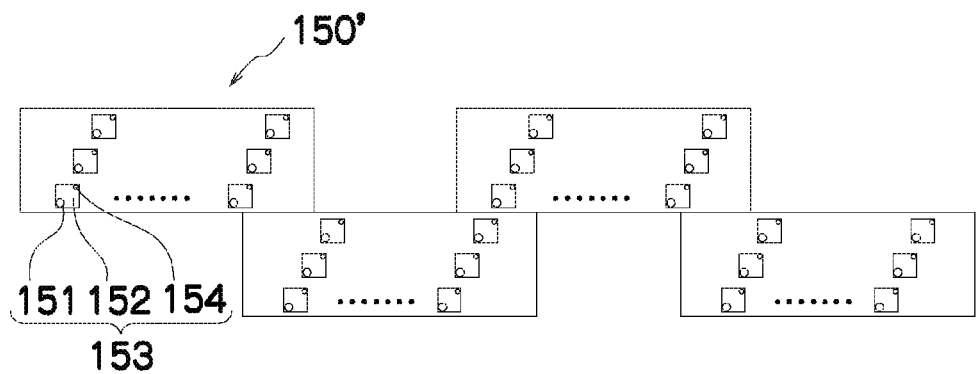
Figure 4:
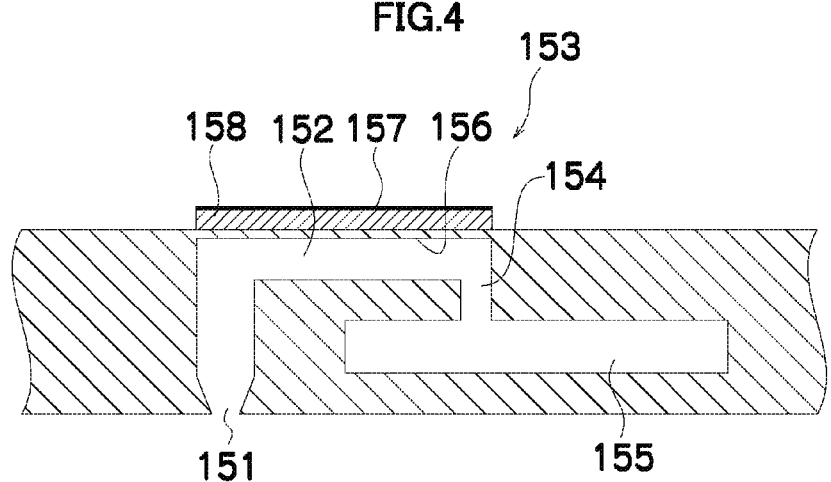
FIG. 4 is a cross-sectional diagram along line 4-4 in FIGS. 3A and 3B.

FIG. 3A is a plan perspective diagram illustrating an example of the structure of a head 150, and FIG. 3B is a partial enlarged diagram of same. Moreover, FIG. 3C is a plan view perspective diagram illustrating a further example of the structure of the head 150. FIG. 4 is a cross-sectional diagram (a cross-sectional diagram along line 4-4 in FIGS. 3A and 3B) illustrating the composition of one liquid ejection element (an ink chamber unit corresponding to one nozzle 151).

The nozzle pitch in the head 150 should be minimized in order to maximize the density of the dots formed on the surface of the recording paper 116. As illustrated in FIGS. 3A and 3B, the head 150 according to the present embodiment has a structure in which a plurality of ink chamber units (liquid ejection elements) 153, each comprising a nozzle 151 forming an ink droplet ejection hole, a pressure chamber 152 corresponding to the nozzle 151, and the like, are disposed two-dimensionally in the form of a staggered matrix, and hence the effective nozzle interval (the projected nozzle pitch) as projected in the lengthwise direction of the head (the direction perpendicular to the paper conveyance direction) is reduced and high nozzle density is achieved.

The mode of forming one or more nozzle rows through a length corresponding to the entire width of the recording paper 116 in a direction substantially perpendicular to the paper conveyance direction is not limited to the example described above. For example, instead of the configuration in FIG. 3A, as illustrated in FIG. 3C, a line head having nozzle rows of a length corresponding to the entire width of the recording paper 116 can be formed by arranging and combining, in a staggered matrix, short head modules 150' having a plurality of nozzles 151 arrayed in a two-dimensional fashion.

As illustrated in FIGS. 3A and 3B, the planar shape of a pressure chamber 152 provided corresponding to each nozzle 151 is substantially a square shape, and an outlet port to the nozzle 151 is provided at one of the ends of a diagonal line of the planar shape, while an inlet port (supply port) 154 for supplying ink is provided at the other end thereof. The shape of the pressure chamber 152 is not limited to that of the present example and various modes are possible in which the planar shape is a quadrilateral shape (diamond shape, rectangular shape, or the like), a pentagonal shape, a hexagonal shape, or other polygonal shapes, or a circular shape, elliptical shape, or the like.

As illustrated in FIG. 4, each pressure chamber 152 is connected to a common flow channel 155 via a supply port 154. The common flow channel 155 is connected to an ink tank (not illustrated), which is a base tank that supplies ink, and the ink supplied from the ink tank is delivered through the common flow channel 155 to the pressure chambers 152.

An actuator 158 provided with an individual electrode 157 is bonded to a pressure plate (a diaphragm that also serves as a common electrode) 156 which forms the surface of one portion (in FIG. 4, the ceiling) of the pressure chambers 152. When a drive voltage is applied to the individual electrode 157 and the common electrode, the actuator 158 deforms, thereby changing the volume of the pressure chamber 152. This causes a pressure change which results in ink being ejected from the nozzle 151. For the actuators 158, it is possible to suitably adopt a piezoelectric element using a piezoelectric body, such as lead zirconate titanate, barium titanate, or the like. When the displacement of the actuator 158 returns to its original position after ejecting ink, the pressure chamber 152 is replenished with new ink from the common flow channel 155, via the supply port 154.

Figure 5:
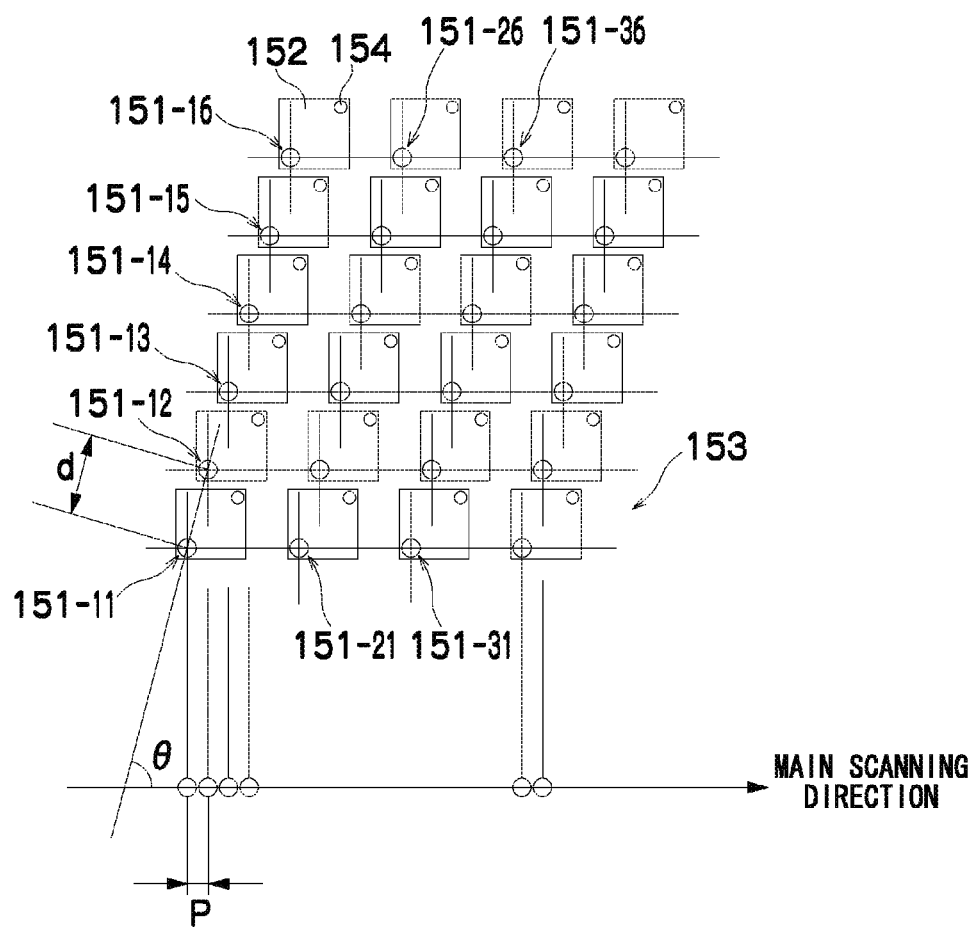
FIG. 5 is an enlarged view illustrating a nozzle arrangement in the printing head illustrated in FIGS. 3A to 3C.

As illustrated in FIG. 5, the high-density nozzle head according to the present embodiment is achieved by arranging a plurality of ink chamber units 153 having the above-described structure in a lattice fashion based on a fixed arrangement pattern, in a row direction which coincides with the main scanning direction, and a column direction which is inclined at a fixed angle of θ with respect to the main scanning direction, rather than being perpendicular to the main scanning direction.

More specifically, by adopting a structure in which a plurality of ink chamber units 153 are arranged at a uniform pitch d in line with a direction forming an angle of θ with respect to the main scanning direction, the pitch P of the nozzles projected so as to align in the main scanning direction is d×cos θ, and hence the nozzles 151 can be regarded to be equivalent to those arranged linearly at a fixed pitch P along the main scanning direction. Such configuration results in a nozzle structure in which the nozzle row projected in the main scanning direction has a high nozzle density of up to 2,400 nozzles per inch in one nozzle row.

More specifically, in a full-line head comprising rows of nozzles of a length corresponding to the entire width of the printable area, "main scanning" is defined as printing one line (a line formed of a row of dots, or a line formed of a plurality of rows of dots) in the breadthways direction of the paper (the direction perpendicular to the conveyance direction of the paper) by driving the nozzles in one of the following ways: (1) simultaneously driving all the nozzles; (2) sequentially driving the nozzles from one side toward the other; and (3) dividing the nozzles into blocks and sequentially driving the blocks of the nozzles from one side toward the other.

In particular, when the nozzles 151 arranged in a matrix such as that illustrated in FIG. 5 are driven, it is desirable that main scanning is performed in accordance with (3) described above. In other words, one line is printed in the breadthways direction of the recording paper 116 by taking the nozzles 151-11, 151-12, 151-13, 151-14, 151-15, 151-16 as one block (and taking the nozzles 151-21, . . . , 151-26, as one block, the nozzles 151-31, . . . , 151-36 as one block, and so on) and sequentially driving the nozzles 151-11, 151-12, . . . , 151-16 in accordance with the conveyance speed of the recording paper 116.

On the other hand, "sub-scanning" is defined as the action of repeatedly perform printing of one line (a line formed of a row of dots, or a line formed of a plurality of rows of dots) formed by the main scanning action, while moving the full-line head and the paper relatively to each other.

The direction indicated by one line (or the lengthwise direction of a band-shaped region) recorded by the main scanning as described above is called the "main scanning direction", and the direction in which the sub-scanning is performed, is called the "sub-scanning direction". In other words, in the present embodiment, the conveyance direction of the recording paper 116 is called the sub-scanning direction and the direction perpendicular to same is called the main scanning direction.

In implementing the present embodiment, the arrangement of the nozzles is not limited to that of the example illustrated. Moreover, in the present embodiment, a method is employed wherein an ink droplet is ejected by means of the deformation of an actuator 158, which is, typically, a piezoelectric element, but in implementing the present embodiment, there are no particular restrictions on the method used for ejecting ink, and instead of a piezo jet method, it is also possible to apply various other types of methods, such as a thermal jet method, wherein the ink is heated and bubbles are caused to form therein, by means of a heat generating body, such as a heater, ink droplets being ejected by means of the pressure of these bubbles.

Configuration of Control System

Figure 6:
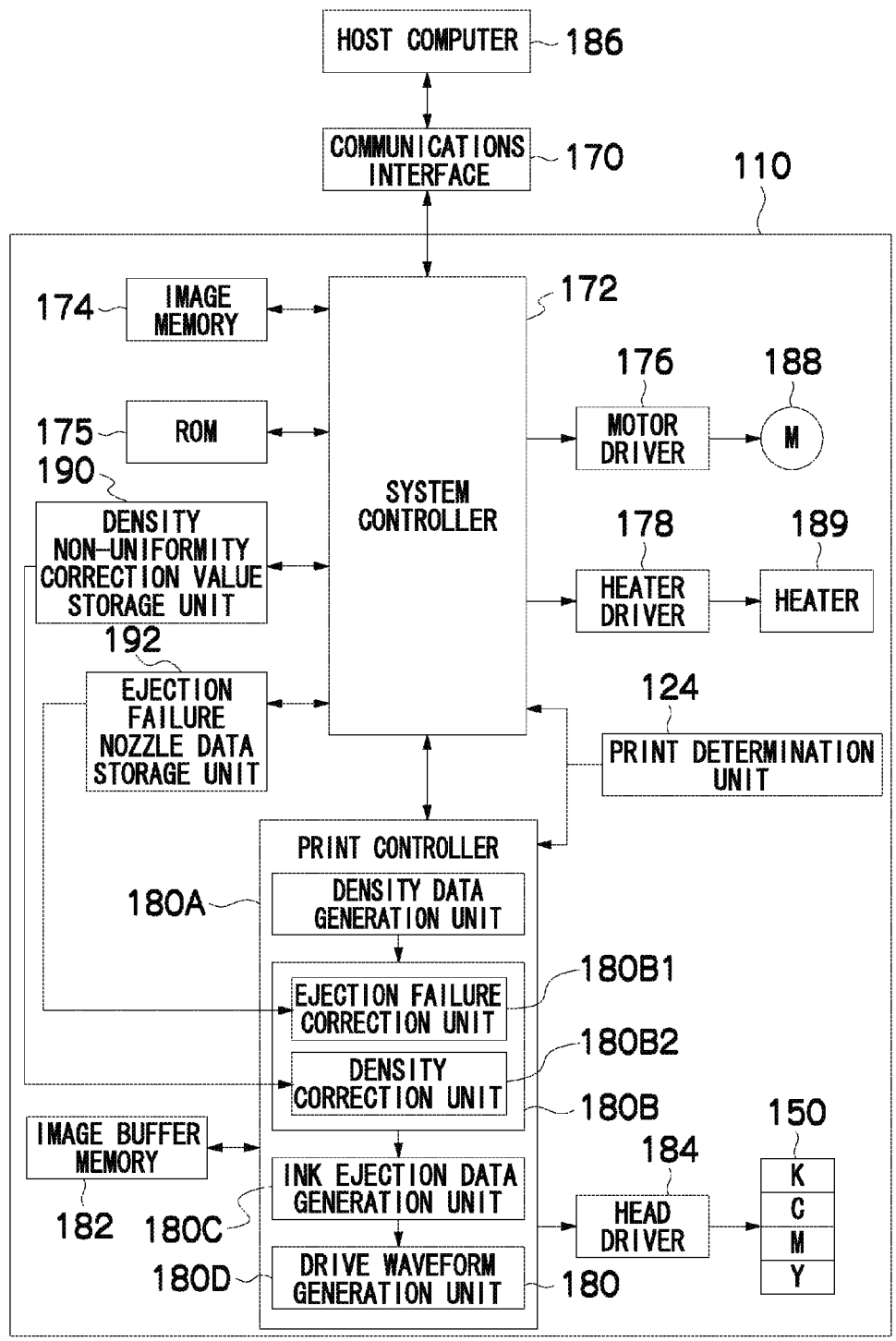
FIG. 6 is a principal block diagram illustrating the system composition of the inkjet recording apparatus.

FIG. 6 is a block diagram illustrating the control system of the inkjet recording device 110. As illustrated in FIG. 6, the inkjet recording device 110 comprises a communications interface 170, a system controller 172, an image memory 174, a ROM 175, a motor driver 176, a heater driver 178, a print controller 180, an image buffer memory 182, a head driver 184, and the like.

The communications interface 170 is an interface unit (image input device) for receiving image data sent from a host computer 186. A serial interface such as USB (Universal Serial Bus), IEEE1394, Ethernet (registered trademark), wireless network, or a parallel interface such as a Centronics interface may be used as the communications interface 170. A buffer memory (not illustrated) may be mounted in this portion in order to increase the communication speed.

The image data sent from the host computer 186 is received by the inkjet recording device 110 through the communications interface 170, and is temporarily stored in the image memory 174. The image memory 174 is a storage device for storing images inputted through the communications interface 170, and data is written and read to and from the memory 174 through the system controller 172. The image memory 174 is not limited to a memory composed of semiconductor elements, and a hard disk drive or another magnetic medium may be used.

The system controller 172 is constituted by a central processing unit (CPU) and peripheral circuits thereof, and the like, and functions as a control device which controls the whole of the inkjet recording device 110 in accordance with prescribed programs, as well as functioning as a calculation device which carries out various calculations. In other words, the system controller 172 controls the various units, such as the communications interface 170, the image memory 174, the motor driver 176, the heater driver 178, and the like, and controls communications with the host computer 186 as well as controlling the reading and writing of data to the image memory 174 and the ROM 175, and furthermore, it also generates control signals for controlling the motor 188 of the conveyance system and the heater 189.

The ROM 175 stores a program which is executed by the CPU of the system controller 172 and various data required for control purposes (including data relating to a test chart for ejection failure determination and a test chart for density measurement), and the like. The ROM 175 may be a non-rewriteable storage device, or a rewriteable storage device, such as an EEPROM.

The image memory 174 is used as a temporary storage region for the image data, and it is also used as a program development region and a calculation work region for the CPU.

Furthermore, the inkjet recording apparatus 110 comprises a density non-uniformity correction value storage unit 190 and an ejection failure nozzle data storage unit 192.

The system controller 172 extracts ejection failure nozzle data showing ejection failure nozzles of the nozzles 115 of the head 150, from the read data of the test chart for ejection failure determination read in from a print determination unit 124, and stores this ejection failure nozzle data in the ejection failure nozzle data storage unit 192.

Moreover, the system controller 172 measures the density measurement value of each nozzle 115 of the head 150 from the read data of the test chart for density measurement read in by the print determination unit 124. The density non-uniformity correction values for the respective nozzles 115 are calculated from the density measurement values and are stored in the density non-uniformity correction value storage unit 190.

It is also possible to adopt a composition in which the ROM 175 also serves as the density non-uniformity correction value storage unit 190 and the ejection failure nozzle data storage unit 192, by utilizing the storage area of the ROM 175.

The motor driver (drive circuit) 176 drives the motors 188 of the conveyance system in accordance with commands from the system controller 172. The heater driver 178 drives the heaters 189 of the post-drying unit 142 and the like in accordance with commands from the system controller 172.

The print controller 180 is a control unit which functions as a signal processing device for performing various treatment processes, corrections, and the like, in accordance with the control implemented by the system controller 172, in order to generate a signal for controlling droplet ejection from the image data (multiple-value input image data) in the image memory 174, as well as functioning as a drive control device which controls the ejection driving of the head 150 by supplying the ink ejection data thus generated to the head driver 184.

In other words, the print controller 180 comprises a density data generation unit 180A, a correction processing unit 180B, an ink ejection data generation unit 180C and a drive waveform generation unit 180D. These functional blocks (180A to 180D) can be realized by means of an ASIC, software or a suitable combination of same.

The density data generation unit 180A is a signal processing device which generates initial density data for the respective ink colors, from the input image data, and it carries out density conversion processing (including UCR processing and color conversion) and, where necessary, also performs pixel number conversion processing.

The correction processing unit 180B is a processing device which carries out non-uniformity correction processing, and is constituted by an ejection failure correction unit 180B1 and a density correction unit 180B2. The ejection failure correction unit 180B1 is a processing device which calculates ejection failure correction using information on ejection failure nozzles stored in the ejection failure nozzle data storage unit 192. Furthermore, the density correction unit 180B2 is a processing device which calculates density correction using density non-uniformity correction values stored in the density non-uniformity correction value storage unit 190.

The ink ejection data generation unit 180C is a signal processing device which includes a half-toning processing device for converting the corrected density data generated by the correction processing unit 180B into binary (or multiple-value) dot data, and performs binary (multiple-value) conversion processing. The ink ejection data generated by the ink ejection data generation unit 180C is supplied to the head driver 184, which controls the ink ejection operation of the head 150 accordingly.

The drive waveform generation unit 180D is a device for generating drive signal waveforms in order to drive the actuators 158 (see FIG. 4) corresponding to the respective nozzles 151 of the head 150. A signal (drive waveform) generated by the drive waveform generation unit 180D is supplied to the head driver 184. The signal output from the drive waveform generation unit 180D may be digital waveform data, or it may be an analog voltage signal.

The image buffer memory 182 is provided in the print controller 180, and image data, parameters, and other data are temporarily stored in the image buffer memory 182 when image data is processed in the print controller 180. FIG. 6 illustrates a mode in which the image buffer memory 182 is attached to the print controller 180; however, the image memory 174 may also serve as the image buffer memory 182. Also possible is a mode in which the print controller 180 and the system controller 172 are integrated to form a single processor.

To give a general description of the sequence of processing from image input to print output, image data to be printed is input from an external source via the communications interface 170, and is accumulated in the image memory 174. At this stage, multiple-value RGB image data is stored in the image memory 174, for example.

In this inkjet recording device 110, an image which appears to have a continuous tonal graduation to the human eye is formed by changing the droplet ejection density and the dot size of fine dots created by ink (coloring material), and therefore, it is necessary to convert the input digital image into a dot pattern which reproduces the tonal graduations of the image (namely, the light and shade toning of the image) as faithfully as possible. Therefore, the original image data (RGB data) stored in the image memory 174 is sent to the print controller 180, via the system controller 172, and is converted to the dot data for each ink color by passing through the density data generation unit 180A, the correction processing unit 180B, and the ink ejection data generation unit 180C of the print controller 180.

In other words, the print controller 180 performs processing for converting the input RGB image data into dot data for the four colors of K, C, M and Y. The dot data generated by the print controller 180 in this way is stored in the image buffer memory 182. This dot data of the respective colors is converted into CMYK droplet ejection data for ejecting ink from the nozzles of the head 150, thereby establishing the ink ejection data to be printed.

The head driver 184 outputs a drive signal for driving the actuators 158 corresponding to the nozzles 151 of the head 150 in accordance with the print contents, on the basis of the ink ejection data and the drive waveform signals supplied by the print controller 180. A feedback control system for maintaining constant drive conditions in the head may be included in the head driver 184.

By supplying the drive signal output by the head driver 184 to the head 150 in this way, ink is ejected from the corresponding nozzles 151. By controlling ink ejection from the printing head 150 in synchronization with the conveyance speed of the recording paper 116, an image is formed on the recording paper 116.

As described above, the ejection volume and the ejection timing of the ink droplets from the respective nozzles are controlled via the head driver 184, on the basis of the ink ejection data and the drive signal waveform generated by implementing prescribed signal processing in the print controller 180. By this means, desired dot size and dot positions can be achieved.

As illustrated in FIG. 1, the print determination unit 124 is a block including an image sensor which reads in the image printed onto the recording medium 116, performs required signal processing operations, and the like, and determines the print situation (presence/absence of ejection, variation in droplet ejection, optical density, and the like), these determination results being supplied to the print controller 180 and the system controller 172.

The print controller 180 implements various corrections with respect to the head 150, on the basis of the information obtained from the print determination unit 124, according to requirements, and it implements control for carrying out cleaning operations (nozzle restoring operations), such as preliminary ejection, suctioning, or wiping, as and when necessary.

It is also possible to adopt a mode in which all or a portion of the functions carried out by the density data generation unit 180A, and the correction processing unit 180B illustrated in FIG. 6 are installed in the host computer 186 side. A mode can also be adopted in which the host computer 186 is made to execute an application program which causes these processes to be implemented.

Process for Calculating Density Correction Values

Figure 7:
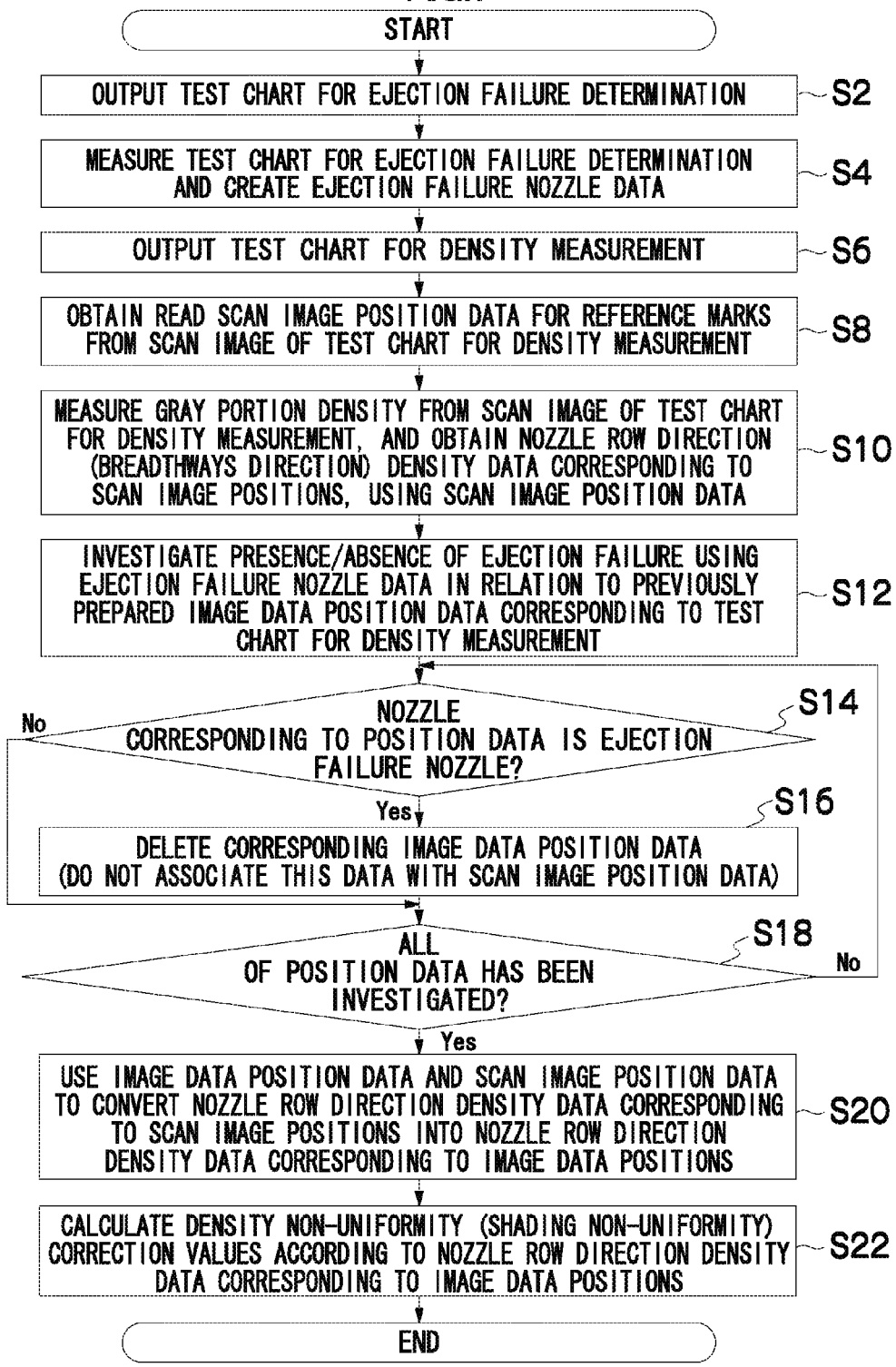
FIG. 7 is a flowchart showing a process of allocating density measurement values.

The process for calculating the density correction values in the present embodiment are now described with reference to FIG. 7. FIG. 7 is a flowchart illustrating steps for calculating density correction values, and depicts processing for one color.

Figure 8:
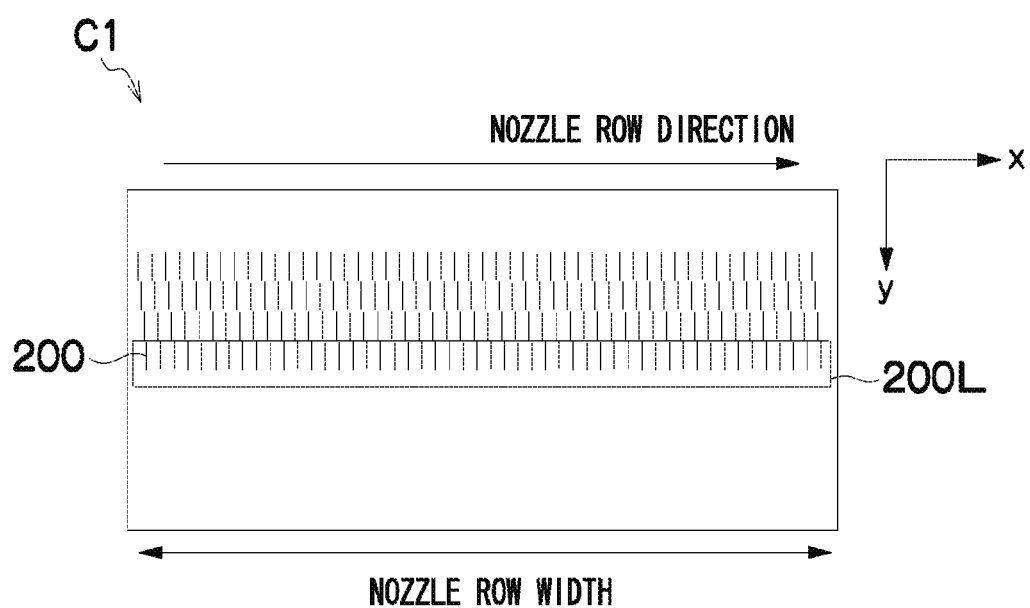
FIG. 8 is a plan diagram illustrating an example of a test chart for ejection failure determination.

Firstly, a test chart for ejection failure determination is output (step S2). This test chart for ejection failure determination makes it possible to judge ejection failure nozzles at the resolution of the print determination unit 124. FIG. 8 is a plan diagram illustrating an example of the test chart for ejection failure determination.

As illustrated in FIG. 8, the test chart for ejection failure determination C1 is formed by printing, at prescribed intervals in the x direction, line-shaped patterns 200 which are substantially parallel to the y direction, by using the recording head 112. When creating a test chart for ejection failure determination C1, more specifically, a pattern 200L corresponding to one line (row) is printed by ejecting liquid every other n nozzles in the x direction. Thereupon, the nozzles which eject liquid are shifted by one nozzle in the x direction and printing is carried out from every other n nozzles. By repeating this n times, the patterns 200 are printed by ejecting the liquid from all of the nozzles.

The test chart C1 for ejection failure determination which has been output in this way is read in by the print determination unit 124, and the system controller 172 generates ejection failure nozzle data representing information relating to ejection failure nozzles, on the basis of the image thus read in (step S4). The generated ejection failure nozzle data is stored in the ejection failure nozzle data storage unit 192.

The determination of ejection failure nozzles is not limited to an example which uses a test chart for ejection failure determination. For example, it is possible to determine ejection failure nozzles, by using an optical sensor which determines the presence or absence of ejected droplets from the respective nozzles 151 or a pressure sensor which measures the internal pressure of the pressure chambers 152.

Thereupon, a test chart for density measurement is output (step S6). The test chart for density measurement is used to measure the density of the ink ejected from the respective nozzles 151.

Figure 9A:
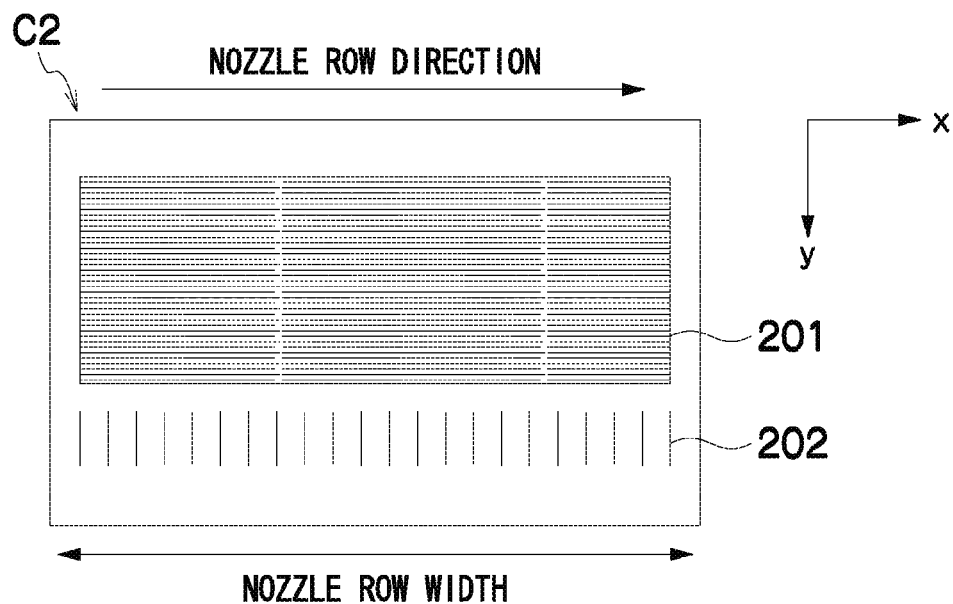
FIGS. 9A and 9B are plan diagrams illustrating a test chart for density measurement.

FIG. 9A is a plan diagram illustrating a test chart for density measurement. As illustrated in FIG. 9A, the test chart for density measurement C2 is constituted by a gray level portion 201 having a prescribed width in the y direction and uniform density in the x direction, and reference marks 202 formed by a plurality of lines having a prescribed length in the y direction which are printed at a prescribed interval in the x direction. FIG. 9A illustrates a test chart for one tone, but the test chart for density measurement C2 may also have gray level portions 201 for a plurality of tones in the y direction. In this case, it is desirable to have at least one reference mark 202 in respect of one gray level 201.

The lines of the reference marks 202 are printed respectively by a single pixel to form line segments at prescribed intervals following the conveyance direction of the recording medium 116 by conveying the recording paper 116 and performing continuous recording (ink ejection) by nozzles spaced at the prescribed interval apart.

The reference marks 202 are used as references for the position of the gray level portion 201 in the nozzle row direction. If the interval between the lines is reduced, then it is possible to obtain more accurate position information, but the image processing load and the computing time involved in acquiring this position information are increased. Consequently, the interval between the lines should be designated appropriately in accordance with these conditions and the resolution of the print determination unit 124.

Figure 9B:
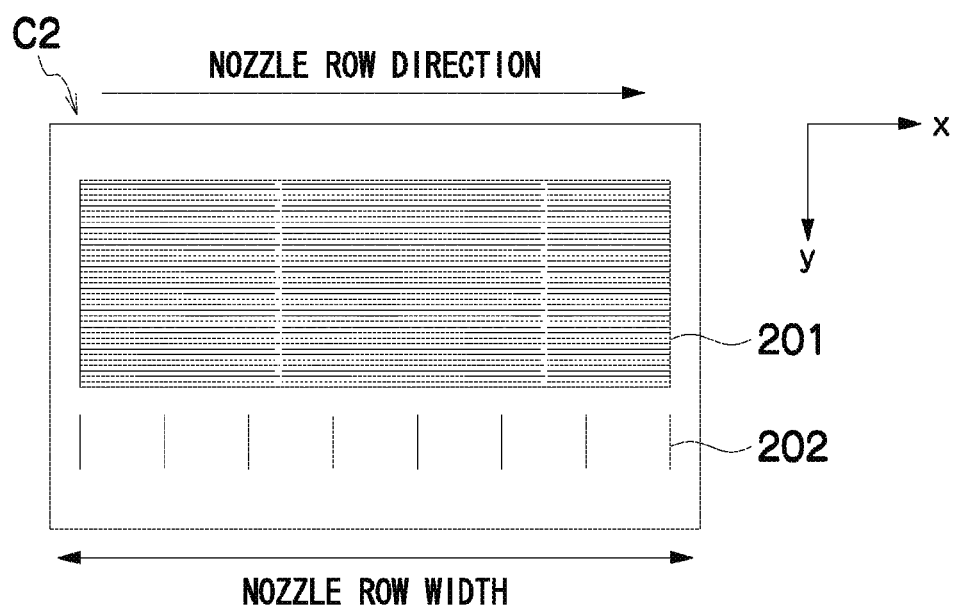

FIG. 9B illustrates a test chart for density measurement C2 composed by using an interval between the lines of the reference marks 202 which is different to the interval in the test chart for density measurement C2 illustrated in FIG. 9A.

An image of the output test chart for density measurement C2 is read in by the print determination unit 124. The system controller 172 extracts the lines of the reference marks 202 from the scan image, and acquires scan image position data indicating the positions of the respective lines of the reference marks 202 (step S8).

Moreover, the system controller 172 measures the density in the nozzle row direction from the gray level portion 201 of the scan image of the test chart for density measurement C2. Nozzle row direction (breadthways direction) density data corresponding to scan image positions, which indicates density data in the nozzle row direction corresponding to the scan image position data, is acquired by using the measured densities and the scan image position data acquired at step S8 (step S10).

Thereupon, the presence or absence of ejection failure in the nozzles corresponding to the image data position data (the nozzles corresponding to the positions of the reference marks 202) is investigated on the basis of previously prepared image data position data corresponding to the test chart for density measurement C2 (nozzle position data corresponding to the positions of the reference marks 202, in other words, position data for the nozzles which have printed the reference marks 202), and the ejection failure nozzle data acquired at step S4 (step S12). From this result, it is judged whether or not a nozzle is an ejection failure nozzle, sequentially in respect of each nozzle, from the left-end nozzle of the plurality of nozzles corresponding to the image data position data (step S14).

If a nozzle corresponding to the image data position data is an ejection failure nozzle, the corresponding image data position data is deleted so as not to be associated with the scan image position data acquired at step S8 (step S16).

Figure 10:
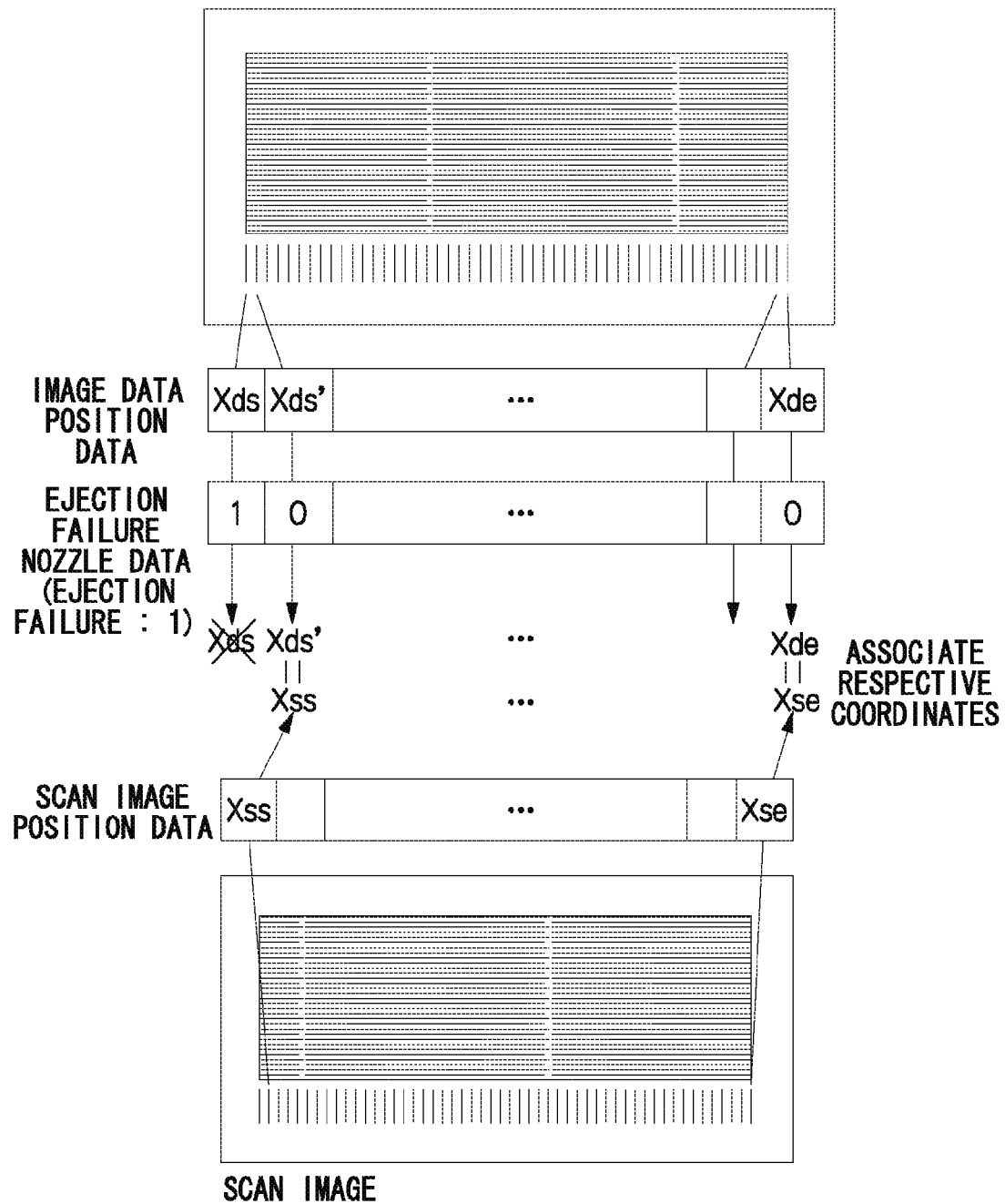
FIG. 10 is a diagram for describing the correspondence between image data position data and scan image position data.

For example, as illustrated in FIG. 10, if the nozzle corresponding to the position $X_{ds}$ of the left-hand line of the reference marks 202 in the image data position data is an ejection failure nozzle, then the data for this position $X_{ds}$ is deleted. More specifically, since the line of the reference mark 202 corresponding to this ejection failure nozzle is not printed, then it is considered from the start that this nozzle is not caused to print a line of the reference mark 202.

Thereupon, the nozzle under judgment is moved one nozzle to the right in the reference marks 202. Since the nozzle corresponding to the position $X_{ds}'$ which is one nozzle to the right-hand side of the position $X_{ds}$ is not an ejection failure nozzle, then the data is not deleted. Consequently, the position $X_{ds}'$ is associated with the position $X_{ss}$ of the left-end line of the reference marks 202 in the scan image position data. More specifically, the line positioned at the leftmost end of the reference marks 202 of the scan image is treated as having been printed by the nozzle corresponding to $X_{ds}'$ in the image data.

In this way, if the nozzle corresponding to the image data position data is an ejection failure nozzle, then by deleting the image data position data in question, it is possible to associate the respective coordinates of the scan image position data and the image data position data with each other in an appropriate fashion.

When the judgment in step S14 has been completed for each of the nozzles corresponding to the image data position data (step S18), then the nozzle row direction density data corresponding to scan image positions is converted into nozzle row direction density data corresponding to image data positions (step S20). In other words, density data having the resolution of the print determination unit 124 is converted to density data having the nozzle resolution.

For example, the density data for the position $X_{ss}$ of the reference marks 202 in the scan image is converted to density data of the nozzle at position $X_{ds}{'}$ of the image data corresponding to the position $X_{ss}$ of the reference marks 202. At positions other than the positions where the respective lines of the reference marks 202 are printed, firstly, the scan image positions are associated with image data positions by interpolation based on the reference marks 202, and the density data for each respective interpolated position is then converted.

Finally, density non-uniformity (shading non-uniformity) correction values are calculated (step S22) on the basis of the nozzle row direction density data corresponding to image data positions calculated at step S20, whereupon the processing is terminated. These density non-uniformity correction values are stored in the density non-uniformity correction value storage unit 190.

Figure 11:
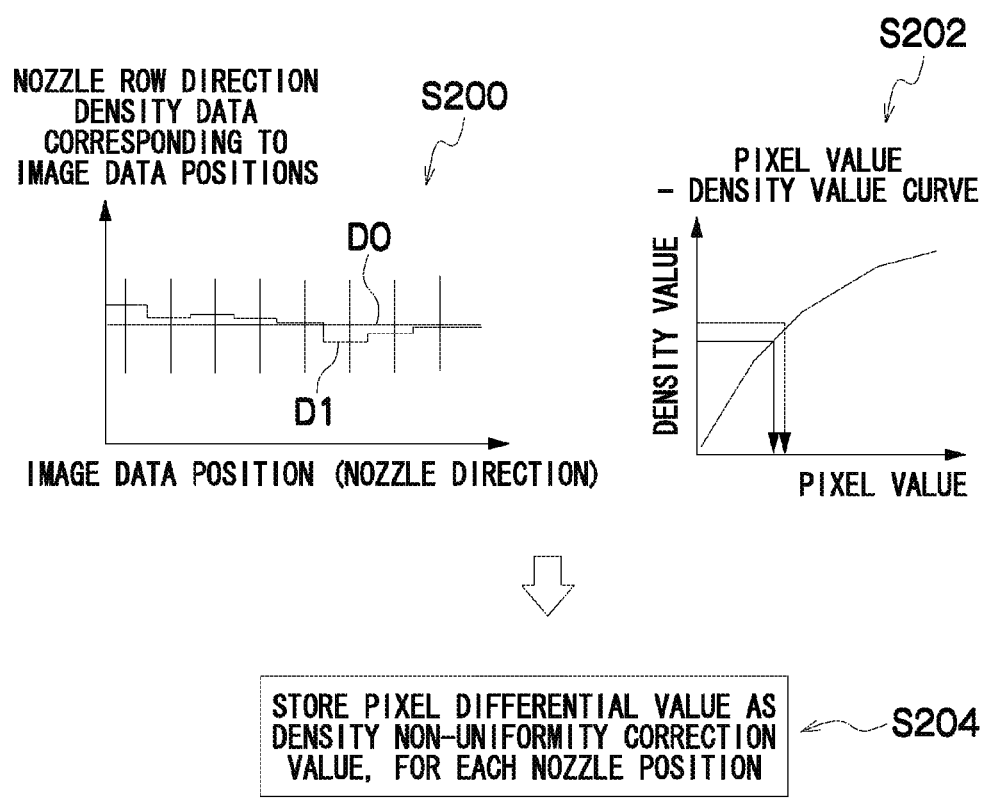
FIG. 11 is a diagram for describing the calculation of a density correction value based on density measurement values.

In calculating the density non-uniformity correction value, firstly, as illustrated in FIG. 11, the differential between the nozzle row direction density data corresponding to image data positions D1 for each image data position data obtained at step S20 and a previously calculated target density value D0 is calculated (step S200).

Next, the differential in the density value for each image data position data calculated at step S200 is converted to a differential in pixel value, in accordance with a pixel value to density value curve which represents the correspondence between the pixel value and the density value (step S202). This differential in the pixel value is stored in the density non-uniformity correction value storage unit 190 as a density non-uniformity correction value for each nozzle position (step S204).

The density correction unit 180B2 calculates density correction in respect of the density acquired from the density data generation unit 180A, on the basis of this density non-uniformity correction value.

In this way, it is judged whether or not a nozzle which has printed a reference mark is an ejection failure nozzle, and by not associating the image data position data with the scan image position data if the nozzle is an ejection failure nozzle, it is possible to correct density non-uniformity appropriately, even if there is an ejection failure nozzle.

Second Embodiment

Figure 12:
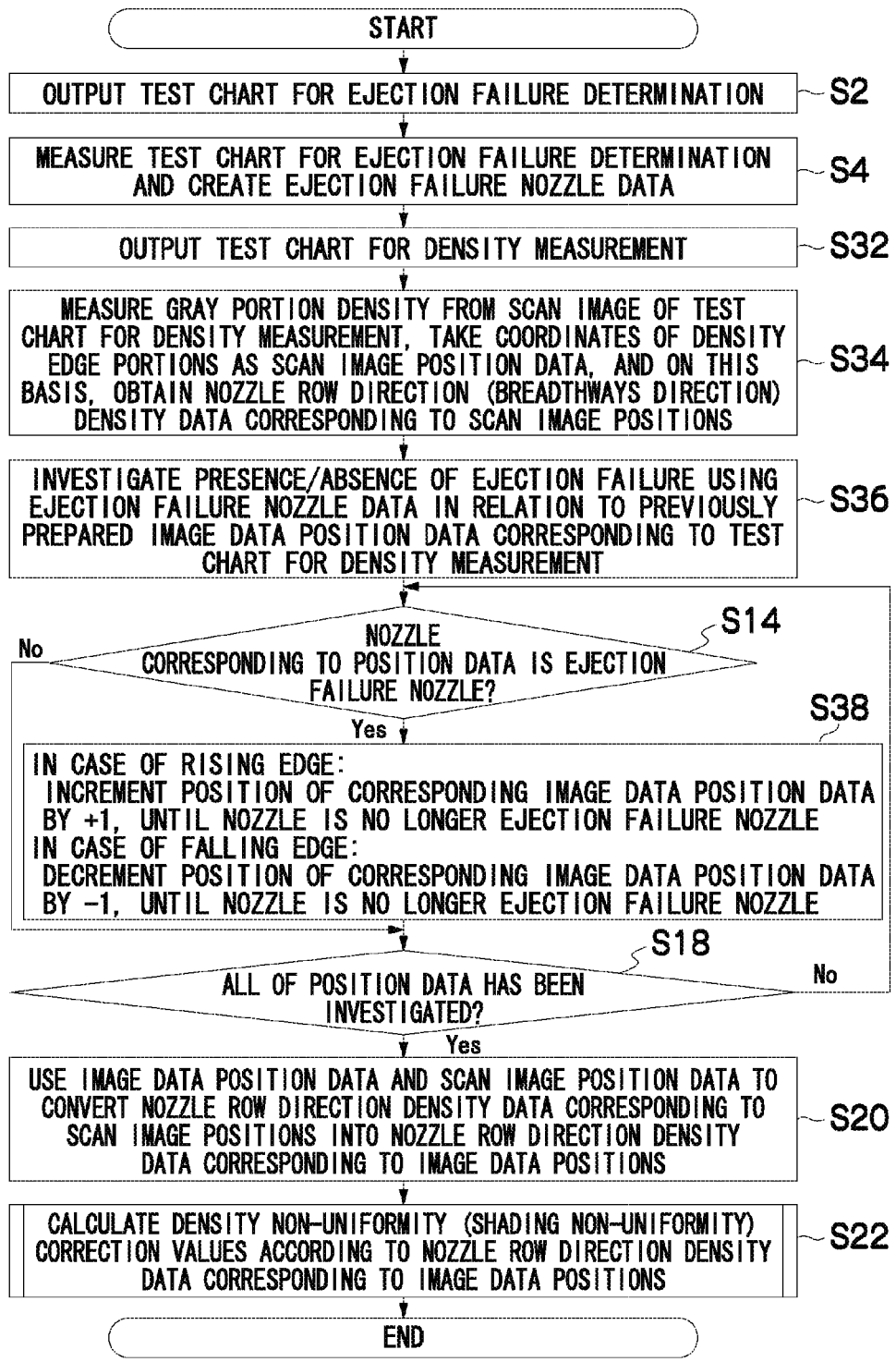
FIG. 12 is a flowchart showing a process of allocating density measurement values according to a second embodiment.

Next, a second embodiment of the present invention will be described with reference to the flowchart in FIG. 12. In the following description, parts of the composition which are the same as or similar to those in the first embodiment described above are omitted from the explanation. In the second embodiment, the inkjet recording apparatus 110 acquires image data position data on the basis of a test chart for density correction which does not include reference marks.

Similarly to the first embodiment, firstly, a test chart for ejection failure determination is output (step S2), the output test chart is measured, and ejection failure nozzle data is created (step S4). The test chart for ejection failure determination C1 output here is similar to that illustrated in FIG. 8.

Thereupon, the test chart for density measurement is output (step S32).

Figure 13:
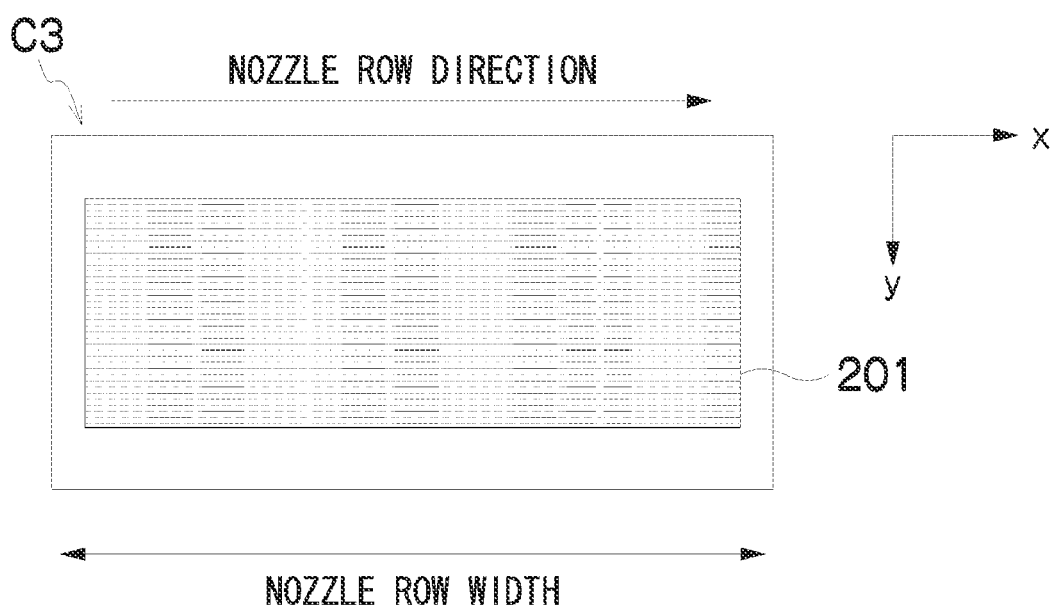
FIG. 13 is a plan diagram illustrating a test chart for density measurement according to the second embodiment.

FIG. 13 is a plan diagram illustrating a test chart for density measurement according to the present embodiment. The test chart for density measurement C3 according to the present embodiment differs from the test chart for density measurement C2 according to the first embodiment in that it does not include reference marks 202 and is constituted by a gray level portion 201 only.

The inkjet recording apparatus 110 reads in the image of the output test chart for density measurement C3 by means of the print determination unit 124. The system controller 172 measures the density in the nozzle row direction from the gray level portion 201 of the scan image of the test chart for density measurement C3.

Furthermore, the system controller 172 determines the density edge portions (the left-end and right-end of the gray level portion 201) from the gray level portion 201 of the scan image, and acquires the coordinates of the determined density edge portions as the scan image position data. The system controller 172 then acquires density data in the nozzle row direction (breadthways direction) corresponding to scan image positions, on the basis of this scan image position data and the density data in the nozzle row direction (step S34).

Thereupon, the presence or absence of ejection failures in the nozzles which printed the density edge portions is investigated on the basis of previously prepared image data position data corresponding to the test chart for density measurement C3 (position data for the nozzles which print the density edge portions, in other words, position data for the left and right-end nozzles), and the ejection failure nozzle data acquired at step S4 (step S36).

Firstly, it is judged whether or not the nozzle corresponding to the rising edge portion of the density edge portions (the left-end nozzle) is an ejection failure nozzle (step S14). If the left-end nozzle is an ejection failure nozzle, then the position of the corresponding image data position data is incremented and thereby moved toward the right-hand side until the nozzle is no longer an ejection failure nozzle (step S38). In other words, the nozzle which has actually printed the rising edge portion is allocated to the left-end position of the image data position data.

Figure 14:
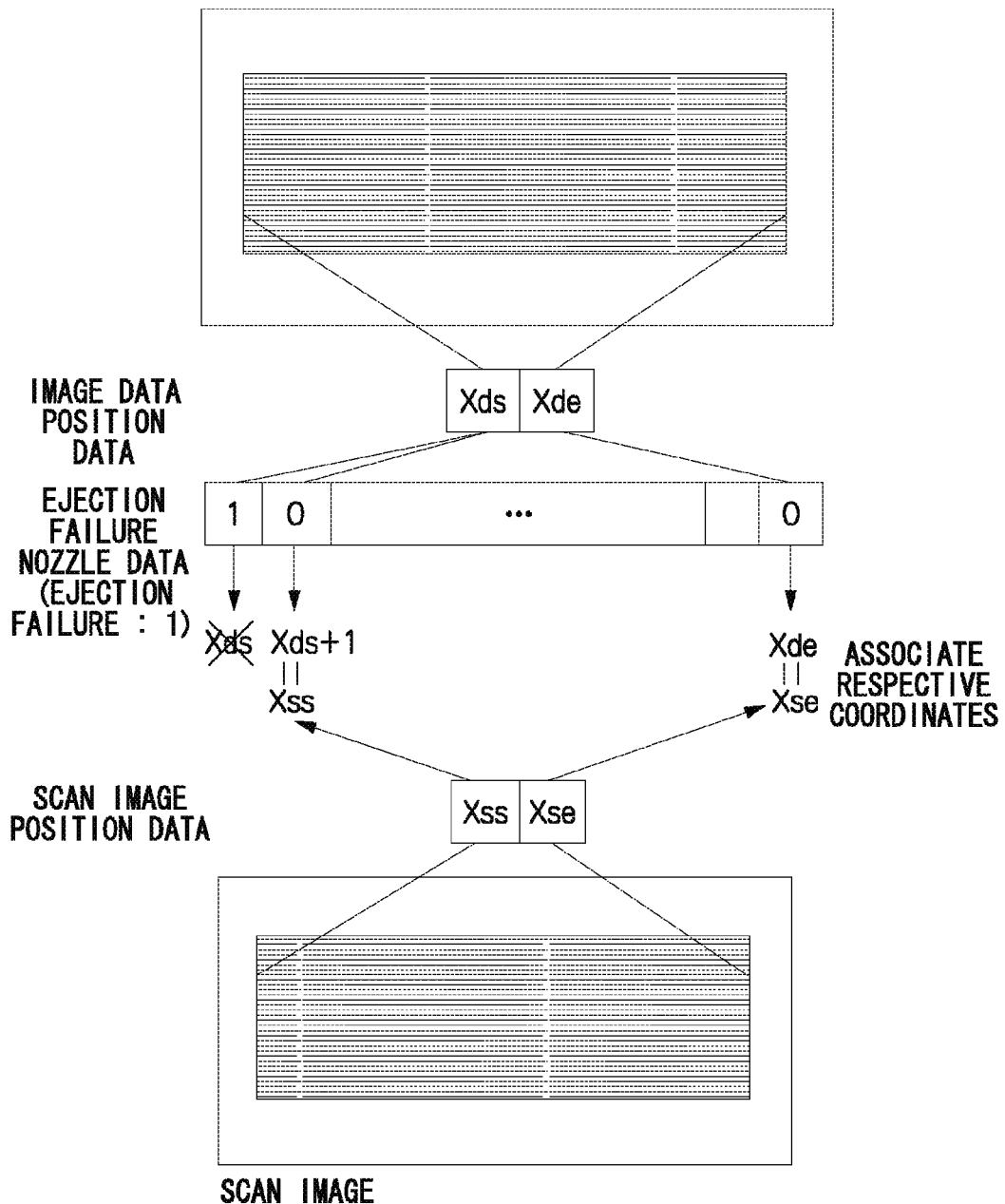
FIG. 14 is a diagram for describing the correspondence between image data position data and scan image position data.

For example, if the nozzle corresponding to the left-end position $X_{ds}$ of the image data position data is an ejection failure nozzle, as illustrated in FIG. 14, then this position $X_{ds}$ is not allocated to the left-end position $X_{ss}$ in the scan image position data. In other words, since this ejection failure nozzle did not print the gray level portion 201, then from the start, it is considered that the gray level portion 201 has not been printed at this nozzle.

Furthermore, since the nozzle corresponding to the position $X_{ds}+1$ one place to the right-hand side of position $X_{ds}$ in the image data position data is not an ejection failure, then this nozzle is allocated to the left-end position $X_{ss}$ in the scan image position data.

Thereupon, it is judged whether or not the nozzle corresponding to the falling edge portion of the density edge portions (the right-end nozzle) is an ejection failure nozzle (step S14). If the right-end nozzle is an ejection failure nozzle, then the position of the corresponding image data position data is decremented and thereby moved toward the left-hand side until the nozzle is no longer an ejection failure nozzle (step S38). In other words, the nozzle which has actually printed the falling edge portion is allocated to the right-end position of the image data position data.

For example, if the nozzle corresponding to the right-end position $X_{de}$ of the image data position data is not an ejection failure nozzle, as illustrated in FIG. 14, then this position $X_{de}$ is allocated to the right-end position $X_{se}$ in the scan image position data. If the nozzle corresponding to the right-end position $X_{de}$ of the image data position data is an ejection failure nozzle, then this position $X_{de}$ is not allocated to the right-end position $X_{se}$ of the scan image position data. In this case, the ejection failure status of the nozzle corresponding to the position $X_{de}-1$ one place to the left-hand side of position $X_{de}$ in the image data position data is investigated. In this way, the processing is continued until the nozzle investigated is not an ejection failure nozzle, and the right-end position $X_{se}$ of the scan image position data is allocated to the position of the nozzle which has printed the falling edge portion of the density edge portions in the scan image.

In this way, if the nozzle corresponding to a density edge portion is an ejection failure nozzle, then by moving the end portion of the image data position data until the nozzle which has actually printed the density edge portion, it is possible to associate the respective coordinates of the scan image position data and the image data position data with each other in an appropriate manner.

Returning to FIG. 12, when the judgment in step S14 has been completed for the rising portion and the falling portion of the density edge portions (step S18), the nozzle row direction density data corresponding to scan image positions is converted into nozzle row direction density data corresponding to image data positions on the basis of the image data position data and the scan image position data (step S20).

Finally, density non-uniformity (shading non-uniformity) correction values are calculated on the basis of the nozzle row direction density data corresponding to image data positions calculated at step S20 (step S22), whereupon the processing is terminated.

In this way, even if using a test chart for density correction which does not include reference marks, by judging whether the nozzle which ought to print a density edge portion is an ejection failure nozzle and, if the nozzle is an ejection failure nozzle, moving the end portion of the image data position data until the nozzle which has actually printed the density edge portion, it is possible to correct density non-uniformity appropriately, even if there is an ejection failure nozzle.

The processing for calculating the density correction values may be carried out by an image processing apparatus which is separate from the inkjet recording apparatus 110.

In the embodiments described above, a print determination unit (scanner) 124 is provided in the inkjet recording apparatus 110, but it is also possible to provide a print determination unit for reading a test chart for density measurement, separately from the inkjet recording apparatus 110.

Furthermore, the embodiments described above uses an example where a full line type of head is employed, but the present invention can also be applied to an inkjet recording apparatus which uses a shuttle type head.

Furthermore, in the embodiments described above, the present invention is applied to an inkjet recording apparatus, but the scope of application of the present invention is not limited to this. More specifically, the present invention can also be applied to image recording apparatuses using formats other than an inkjet recording apparatus, for example, a thermal transfer recording apparatus comprising a recording head which uses thermal elements as recording elements, an LED electrophotographic printer comprising a recording head which uses LED elements as recording elements, and a silver photographic printer (silver halide photography type of printer) which has an LED line exposure head.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image recording apparatus, comprising:
   a recording head having a plurality of recording elements;
   a conveyance device which conveys at least one of the recording head and a recording medium so as to cause relative movement between the recording head and the recording medium;
   a test chart output device which outputs a test chart including at least a density pattern onto the recording medium by using the recording head;
   an image reading device which reads in the test chart output by the test chart output device;
   a reading position information acquisition device which acquires reading position information for the density pattern, according to an image of the test chart obtained by reading in the test chart by the image reading device;
   a density information acquisition device which acquires reading density information for the density pattern corresponding to the reading position information, according to the image of the test chart obtained by reading in the test chart by the image reading device;
   a recording defect information acquisition device which acquires recording defect information indicating a recording element having a recording defect, of the plurality of recording elements;
   a density non-uniformity correction value calculation device which calculates density non-uniformity correction values for the plurality of recording elements, according to previously prepared output position information which indicates output positions of the plurality of recording elements with respect to the density pattern, the reading position information, the reading density information and the recording defect information;
   a density non-uniformity correction device which performs non-uniformity correction of image data, according to the density non-uniformity correction values; and
   an image output device which outputs the image data that has been subjected to the non-uniformity correction by the density non-uniformity correction device, onto the recording medium.

2. The image recording apparatus as defined in claim 1, wherein the density non-uniformity correction value calculation device includes:
   an output position information amendment device which amends the output position information according to the recording defect information; and
   a density information allocation device which associates the reading position information with the output position information so as to allocate the reading density information to output density information of the plurality of recording elements, and
   wherein the density non-uniformity correction value calculation device calculates the density non-uniformity correction values for the plurality of recording elements according to the output density information.

3. The image recording apparatus as defined in claim 1, wherein:
   the test chart includes reference marks constituted by a plurality of lines arranged at a prescribed interval in a direction of arrangement of the plurality of recording elements; and
   the reading position information acquisition device acquires the reading position information for the density pattern according to the reference marks.

4. The image recording apparatus as defined in claim 3, wherein each of the plurality of lines constituting the reference marks is associated with one recording element.

5. The image recording apparatus as defined in claim 3, wherein:
the density non-uniformity correction value calculation device includes:
an output position information amendment device which amends the output position information according to the recording defect information; and
a density information allocation device which associates the reading position information with the output position information so as to allocate the reading density information to output density information of the plurality of recording elements;
the density non-uniformity correction value calculation device calculates the density non-uniformity correction values for the plurality of recording elements according to the output density information;
the output position information is information on recording elements at positions respectively corresponding to the plurality of lines constituting the reference marks;
the image recording apparatus further comprises a judgment device which judges whether or not the recording elements at the positions respectively corresponding to the plurality of lines constituting the reference marks include a recording element having a recording defect, according to the recording defect information; and
when the judgment device judges that the recording elements includes a recording element having a recording defect, then the output position information amendment device amends the output position information in such a manner that the density information allocation device does not use information on the recording element having the recording defect.

6. The image recording apparatus as defined in claim 1, wherein the reading position information acquisition device acquires the reading position information for the density pattern according to a density edge portion of the density pattern in a direction of arrangement of the plurality of recording elements.

7. The image recording apparatus as defined in claim 6, wherein:
the density non-uniformity correction value calculation device includes:
an output position information amendment device which amends the output position information according to the recording defect information; and
a density information allocation device which associates the reading position information with the output position information so as to allocate the reading density information to output density information of the plurality of recording elements;
the density non-uniformity correction value calculation device calculates the density non-uniformity correction values for the plurality of recording elements according to the output density information;
the output position information is information on the recording element at a position corresponding to the density edge portion; and
if the recording element at the position corresponding to the density edge portion has a recording defect, the output position information amendment device adopts information on the recording element at a position one place toward inside in respect of the density pattern, as the output position information.

8. The image recording apparatus as defined in claim 1, wherein the recording defect information acquisition device uses a test chart for recording defect determination to acquire the recording defect information.

9. The image recording apparatus as defined in claim 1, wherein the plurality of recording elements are ink ejection nozzles.

10. An image processing apparatus, comprising:
a reading position information acquisition device which acquires reading position information for a density pattern, according to a read image of a test chart including at least the density pattern, the test chart having been output onto a recording medium while relative movement between a recording head having a plurality of recording elements and the recording medium by conveying at least one of the recording head and the recording medium;
a density information acquisition device which acquires reading density information for the density pattern corresponding to the reading position information, according to the read image of the test chart;
a recording defect information acquisition device which acquires recording defect information indicating a recording element having a recording defect, of the plurality of recording elements;
a density non-uniformity correction value calculation device which calculates density non-uniformity correction values for the plurality of recording elements, according to previously prepared output position information which indicates output positions of the plurality of recording elements with respect to the density pattern, the reading position information, the reading density information and the recording defect information; and
a density non-uniformity correction device which performs non-uniformity correction of image data, according to the density non-uniformity correction values.

11. An image processing method, comprising:
a reading position information acquisition step of acquiring reading position information for a density pattern, according to a read image of a test chart including at least the density pattern, the test chart having been output onto a recording medium while relative movement between a recording head having a plurality of recording elements and the recording medium by conveying at least one of the recording head and the recording medium;
a density information acquisition step of acquiring reading density information for the density pattern corresponding to the reading position information, according to the read image of the test chart;
a recording defect information acquisition step of acquiring recording defect information indicating a recording element having a recording defect, of the plurality of recording elements;
a density non-uniformity correction value calculation step of calculating density non-uniformity correction values for the plurality of recording elements, according to previously prepared output position information which indicates output positions of the plurality of recording elements with respect to the density pattern, the reading position information, the reading density information and the recording defect information; and
a density non-uniformity correction step of performing non-uniformity correction of image data, according to the density non-uniformity correction values.

12. A computer-readable medium storing instructions to cause a computer to execute at least an image processing method, comprising:

- a reading position information acquisition step of acquiring reading position information for a density pattern, according to a read image of a test chart including at least the density pattern, the test chart having been output onto a recording medium while relative movement between a recording head having a plurality of recording elements and the recording medium by conveying at least one of the recording head and the recording medium;
- a density information acquisition step of acquiring reading density information for the density pattern corresponding to the reading position information, according to the read image of the test chart;
- a recording defect information acquisition step of acquiring recording defect information indicating a recording element having a recording defect, of the plurality of recording elements;
- a density non-uniformity correction value calculation step of calculating density non-uniformity correction values for the plurality of recording elements, according to previously prepared output position information which indicates output positions of the plurality of recording elements with respect to the density pattern, the reading position information, the reading density information and the recording defect information; and
- a density non-uniformity correction step of performing non-uniformity correction of image data, according to the density non-uniformity correction values.

* * * * *